United States Patent
Mirjalili et al.

(10) Patent No.: US 11,137,622 B2
(45) Date of Patent: Oct. 5, 2021

(54) EYE-MOUNTED DISPLAYS INCLUDING EMBEDDED CONDUCTIVE COILS

(71) Applicant: Spy Eye, LLC, Palo Alto, CA (US)

(72) Inventors: Ramin Mirjalili, San Jose, CA (US); Thomas Llewellyn Owens, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 413 days.

(21) Appl. No.: 16/035,640

(22) Filed: Jul. 15, 2018

(65) Prior Publication Data

US 2020/0018990 A1 Jan. 16, 2020

(51) Int. Cl.
*G02C 7/04* (2006.01)
*G02B 27/01* (2006.01)
(Continued)

(52) U.S. Cl.
CPC ......... *G02C 7/049* (2013.01); *G02B 27/0172* (2013.01); *G02C 7/088* (2013.01);
(Continued)

(58) Field of Classification Search
CPC ........ G02C 7/049; G02C 7/088; G02C 11/10; G02C 7/04; G02B 27/017; G02B 2027/013; G03B 21/14
See application file for complete search history.

(56) References Cited

U.S. PATENT DOCUMENTS

| 4,014,321 A | 3/1977 | March |
| 4,577,545 A | 3/1986 | Kemeny |

(Continued)

FOREIGN PATENT DOCUMENTS

| CA | 2280022 | 1/2001 |
| CA | 2280022 A1 | 1/2001 |

(Continued)

OTHER PUBLICATIONS

Paperno et al., A New Method for Magnetic Position and Orientation Tracking, IEEE Transactions on Magnetics, vol. 37, No. 4, Jul. 2001, pp. 1938-1940.
(Continued)

*Primary Examiner* — James C. Jones
(74) *Attorney, Agent, or Firm* — Fenwick & West LLP

(57) ABSTRACT

An augmented reality system can include an electronic contact lens and a power source. The source generates a time-varying magnetic field which induces a time-varying current in conductive coils embedded in the electronic contact lens. The electronic contact lens uses the induced current to harvest power or to determine the orientation of the contact lens. The embedded conductive coils are positioned such that the AR system can harvest power and estimate the orientation of the eye at a variety of contact lens orientations. The conductive coils may be embedded within the contact lens at any number of positions and orientations. The embedded coils can encircle a portion of the contact lens and can collectively form an annulus within the contact lens. The conductive coils are embedded such that for at least three conductive coils, no two of the planes defined by the at least three conductive coils are parallel.

13 Claims, 18 Drawing Sheets

(51) Int. Cl.
  *G02C 7/08*   (2006.01)
  *G03B 21/14*  (2006.01)
  *G02C 11/00*  (2006.01)
(52) U.S. Cl.
  CPC .............. *G02C 11/10* (2013.01); *G03B 21/14* (2013.01); *G02B 2027/013* (2013.01)

(56) References Cited

U.S. PATENT DOCUMENTS

| | | |
|---|---|---|
| 4,871,247 A | 10/1989 | Haynes |
| 4,941,068 A | 7/1990 | Hofmann |
| 5,331,149 A | 7/1994 | Spitzer |
| 5,467,104 A | 11/1995 | Furness, III |
| 5,638,218 A | 6/1997 | Oomura |
| 5,638,219 A | 6/1997 | Medina Puerta |
| 5,682,210 A | 10/1997 | Weirich |
| 5,699,193 A | 12/1997 | Monno |
| 5,712,721 A | 1/1998 | Large |
| 5,726,916 A | 3/1998 | Smyth |
| 6,120,460 A | 9/2000 | Abreu |
| 6,181,287 B1 | 1/2001 | Beigel |
| 6,215,593 B1 | 4/2001 | Bruce |
| 6,307,945 B1 | 10/2001 | Hall |
| 6,312,393 B1 | 11/2001 | Abreu |
| 6,509,743 B1 | 1/2003 | Ferrero |
| 6,570,386 B2 | 5/2003 | Goldstein |
| 6,594,370 B1 | 7/2003 | Anderson |
| 6,823,171 B1 | 11/2004 | Kaario |
| 6,851,805 B2 | 2/2005 | Blum |
| 6,920,283 B2 | 7/2005 | Goldstein |
| 7,088,235 B1 | 8/2006 | Carricut |
| 7,137,952 B2 | 11/2006 | Leonardi |
| 7,359,059 B2 | 4/2008 | Lust |
| 7,562,445 B2 | 7/2009 | Lerch |
| 7,626,562 B2 | 12/2009 | Iwasaki |
| 7,758,187 B2 | 7/2010 | Amirparviz |
| 7,835,056 B2 | 11/2010 | Doucet |
| 7,893,832 B2 | 2/2011 | Laackmann |
| 7,931,832 B2 | 4/2011 | Pugh |
| 8,077,245 B2 | 12/2011 | Adamo |
| 8,087,777 B2 | 1/2012 | Rosenthal |
| 8,096,654 B2 | 1/2012 | Amirparviz |
| 8,348,422 B2 | 1/2013 | Pugh |
| 8,348,424 B2 | 1/2013 | Pugh |
| 8,394,660 B2 | 3/2013 | Kim |
| 8,398,239 B2 | 3/2013 | Horning |
| 8,430,310 B1 | 4/2013 | Ho |
| 8,441,731 B2 | 5/2013 | Sprague |
| 8,446,341 B2 | 5/2013 | Amirparviz |
| 8,482,858 B2 | 7/2013 | Sprague |
| 8,520,309 B2 | 8/2013 | Sprague |
| 8,526,879 B2 | 9/2013 | Kristiansen |
| 8,579,434 B2 | 11/2013 | Amirparviz |
| 8,582,209 B1 | 11/2013 | Amirparviz |
| 8,608,310 B2 | 12/2013 | Otis |
| 8,632,182 B2 | 1/2014 | Chen |
| 8,721,074 B2 | 5/2014 | Pugh |
| 8,764,185 B1 | 7/2014 | Biederman |
| 8,781,570 B2 | 7/2014 | Chuang |
| 8,786,520 B2 | 7/2014 | Legerton |
| 8,786,675 B2 | 7/2014 | Deering |
| 8,798,332 B2 | 8/2014 | Otis |
| 8,827,445 B1 | 9/2014 | Wiser |
| 8,830,571 B1 | 9/2014 | Vizgaitis |
| 8,870,370 B1 | 10/2014 | Otis |
| 8,874,182 B2 | 10/2014 | Etzkorn |
| 8,906,088 B2 | 12/2014 | Pugh |
| 8,911,078 B2 | 12/2014 | Meyers |
| 8,922,898 B2 | 12/2014 | Legerton |
| 8,926,809 B2 | 1/2015 | Pletcher |
| 8,931,906 B2 | 1/2015 | Huang |
| 8,960,898 B1 | 2/2015 | Etzkorn |
| 8,963,268 B2 | 2/2015 | Kim |
| 8,964,298 B2 | 2/2015 | Haddick |
| 8,971,978 B2 | 3/2015 | Ho |
| 8,985,763 B1 | 3/2015 | Etzkorn |
| 8,989,834 B2 | 3/2015 | Ho |
| 9,000,000 B2 | 4/2015 | Carroll |
| 9,028,068 B2 | 5/2015 | Chang |
| 9,039,171 B2 | 5/2015 | Groisman |
| 9,040,923 B2 | 5/2015 | Sprague |
| 9,047,512 B2 | 6/2015 | Otis |
| 9,048,389 B2 | 6/2015 | Fu |
| 9,052,528 B2 | 6/2015 | Pugh |
| 9,052,533 B2 | 6/2015 | Pugh |
| 9,054,079 B2 | 6/2015 | Etzkorn |
| 9,058,053 B2 | 6/2015 | Covington |
| 9,063,351 B1 | 6/2015 | Ho |
| 9,063,352 B2 | 6/2015 | Ford |
| 9,111,473 B1 | 8/2015 | Ho |
| 9,130,099 B2 | 9/2015 | Robin |
| 9,130,122 B2 | 9/2015 | Fu |
| 9,134,546 B2 | 9/2015 | Pugh |
| 9,153,074 B2 | 10/2015 | Zhou |
| 9,158,133 B1 | 10/2015 | Pletcher |
| 9,161,712 B1 | 10/2015 | Etzkorn |
| 9,170,646 B2 | 10/2015 | Toner |
| 9,178,107 B2 | 11/2015 | Tsai |
| 9,192,298 B2 | 11/2015 | Bouwstra |
| 9,195,075 B2 | 11/2015 | Pugh |
| 9,196,094 B2 | 11/2015 | Ur |
| 9,215,293 B2 | 12/2015 | Miller |
| 9,217,881 B2 | 12/2015 | Pugh |
| 9,225,375 B2 | 12/2015 | Pugh |
| 9,244,285 B2 | 1/2016 | Chen |
| 9,271,677 B2 | 3/2016 | Leonardi |
| 9,282,920 B2 | 3/2016 | Ho |
| 9,289,123 B2 | 3/2016 | Weibel |
| 9,289,954 B2 | 3/2016 | Linhardt |
| 9,298,002 B2 | 3/2016 | Border |
| 9,298,020 B1 | 3/2016 | Etzkorn |
| D754,861 S | 4/2016 | Etzkorn |
| 9,307,905 B2 | 4/2016 | Varel |
| 9,310,626 B2 | 4/2016 | Pugh |
| 9,316,848 B2 | 4/2016 | Pugh |
| 9,326,710 B1 | 5/2016 | Liu |
| 9,332,935 B2 | 5/2016 | Etzkorn |
| 9,335,562 B2 | 5/2016 | Pugh |
| 9,341,843 B2 | 5/2016 | Border |
| 9,366,872 B2 | 6/2016 | Honea |
| 9,366,881 B2 | 6/2016 | Pugh |
| 9,389,433 B2 | 7/2016 | Pugh |
| 9,401,454 B2 | 7/2016 | Robin |
| 9,414,746 B2 | 8/2016 | Bergman |
| 9,425,359 B2 | 8/2016 | Tsai |
| 9,442,307 B2 | 9/2016 | Meyers |
| 9,442,310 B2 | 9/2016 | Biederman |
| 9,445,768 B2 | 9/2016 | Alexander |
| 9,523,865 B2 | 12/2016 | Pletcher |
| 9,629,774 B2 | 4/2017 | Dayal |
| 9,728,981 B2 | 8/2017 | Lee |
| 9,810,926 B2 | 11/2017 | Sako |
| 9,939,658 B1 | 4/2018 | Gutierrez |
| 10,025,118 B1 | 7/2018 | Markus |
| 10,278,644 B1 | 5/2019 | Etzkorn |
| 2002/0067232 A1 | 6/2002 | Oshima |
| 2002/0084904 A1 | 7/2002 | De La Huerga |
| 2002/0101383 A1 | 8/2002 | Junod |
| 2003/0173408 A1 | 9/2003 | Mosher |
| 2003/0179094 A1 | 9/2003 | Abreu |
| 2004/0027536 A1 | 2/2004 | Blum |
| 2005/0179604 A1 | 8/2005 | Liu |
| 2006/0177086 A1 | 8/2006 | Rye |
| 2006/0290882 A1 | 12/2006 | Meyers |
| 2007/0024423 A1 | 2/2007 | Nikitin |
| 2007/0241986 A1 | 10/2007 | Lee |
| 2008/0165072 A1 | 7/2008 | Schlager |
| 2009/0058189 A1 | 3/2009 | Cook |
| 2009/0066722 A1 | 3/2009 | Kriger |
| 2009/0072628 A1 | 3/2009 | Cook |
| 2009/0244477 A1 | 10/2009 | Pugh |
| 2010/0001926 A1 | 1/2010 | Amirparviz |
| 2010/0110372 A1 | 5/2010 | Pugh |
| 2010/0136905 A1 | 6/2010 | Kristiansen |

(56) References Cited

U.S. PATENT DOCUMENTS

| | | |
|---|---|---|
| 2010/0234717 A1 | 9/2010 | Wismer |
| 2010/0253476 A1 | 10/2010 | Poutiatine |
| 2010/0308749 A1 | 12/2010 | Liu |
| 2011/0034134 A1 | 2/2011 | Henderson |
| 2011/0046475 A1 | 2/2011 | Assif |
| 2011/0221659 A1 | 9/2011 | King, III |
| 2012/0092612 A1* | 4/2012 | Binder ............... A61F 2/1613 351/159.02 |
| 2012/0105226 A1 | 5/2012 | Bourdeau |
| 2012/0262003 A1 | 10/2012 | Tetu |
| 2013/0050432 A1 | 2/2013 | Perez |
| 2013/0100139 A1 | 4/2013 | Schliesser |
| 2013/0242077 A1 | 9/2013 | Lin |
| 2013/0270664 A1 | 10/2013 | Kim |
| 2014/0016097 A1 | 1/2014 | Leonardi |
| 2014/0063054 A1 | 3/2014 | Osterhout |
| 2014/0081178 A1 | 3/2014 | Pletcher |
| 2014/0098226 A1 | 4/2014 | Pletcher |
| 2014/0120983 A1 | 5/2014 | Lam |
| 2014/0192311 A1 | 7/2014 | Pletcher |
| 2014/0198128 A1 | 7/2014 | Hong |
| 2014/0240665 A1 | 8/2014 | Pugh |
| 2014/0252868 A1 | 9/2014 | Yamada |
| 2014/0292620 A1 | 10/2014 | Lapstun |
| 2014/0371560 A1 | 12/2014 | Etzkorn |
| 2015/0005604 A1 | 1/2015 | Biederman |
| 2015/0016777 A1 | 1/2015 | Abovitz |
| 2015/0060904 A1 | 3/2015 | Robin |
| 2015/0062533 A1 | 3/2015 | Toner |
| 2015/0072615 A1 | 3/2015 | Mofidi |
| 2015/0088253 A1 | 3/2015 | Doll |
| 2015/0123785 A1 | 5/2015 | Haflinger |
| 2015/0126845 A1 | 5/2015 | Jin |
| 2015/0145095 A1 | 5/2015 | Kim |
| 2015/0147975 A1 | 5/2015 | Li |
| 2015/0148628 A1 | 5/2015 | Abreu |
| 2015/0150510 A1 | 6/2015 | Leonardi |
| 2015/0171274 A1 | 6/2015 | Guo |
| 2015/0173602 A1 | 6/2015 | Barrows |
| 2015/0223684 A1 | 8/2015 | Hinton |
| 2015/0227735 A1 | 8/2015 | Chappell |
| 2015/0234205 A1 | 8/2015 | Schowengerdt |
| 2015/0235439 A1 | 8/2015 | Schowengerdt |
| 2015/0235440 A1 | 8/2015 | Schowengerdt |
| 2015/0235444 A1 | 8/2015 | Schowengerdt |
| 2015/0235446 A1 | 8/2015 | Schowengerdt |
| 2015/0235457 A1 | 8/2015 | Schowengerdt |
| 2015/0235468 A1 | 8/2015 | Schowengerdt |
| 2015/0235471 A1 | 8/2015 | Schowengerdt |
| 2015/0241698 A1 | 8/2015 | Schowengerdt |
| 2015/0243090 A1 | 8/2015 | Schowengerdt |
| 2015/0261294 A1 | 9/2015 | Urbach |
| 2015/0281411 A1 | 10/2015 | Markus |
| 2015/0301338 A1 | 10/2015 | Van Heugten |
| 2015/0305929 A1 | 10/2015 | Goldberg et al. |
| 2015/0339857 A1 | 11/2015 | O'Connor |
| 2015/0362750 A1 | 12/2015 | Yeager |
| 2015/0362752 A1 | 12/2015 | Linhardt |
| 2015/0372395 A1 | 12/2015 | Lavedas |
| 2015/0380461 A1 | 12/2015 | Robin |
| 2015/0380988 A1 | 12/2015 | Chappell |
| 2016/0006115 A1 | 1/2016 | Etzkorn |
| 2016/0011419 A1 | 1/2016 | Gao |
| 2016/0018650 A1 | 1/2016 | Haddick |
| 2016/0018651 A1 | 1/2016 | Haddick |
| 2016/0018652 A1 | 1/2016 | Haddick |
| 2016/0018653 A1 | 1/2016 | Haddick |
| 2016/0030160 A1 | 2/2016 | Markus |
| 2016/0049544 A1 | 2/2016 | Robin |
| 2016/0066825 A1 | 3/2016 | Barrows |
| 2016/0080855 A1 | 3/2016 | Greenberg |
| 2016/0091737 A1 | 3/2016 | Kim |
| 2016/0093666 A1 | 3/2016 | Gilet |
| 2016/0097940 A1 | 4/2016 | Sako |
| 2016/0113760 A1 | 4/2016 | Conrad |
| 2016/0141449 A1 | 5/2016 | Robin |
| 2016/0141469 A1 | 5/2016 | Robin |
| 2016/0143728 A1 | 5/2016 | De Smet |
| 2016/0147301 A1 | 5/2016 | Iwasaki |
| 2016/0154256 A1 | 6/2016 | Yajima |
| 2016/0172536 A1 | 6/2016 | Tsai |
| 2016/0172869 A1 | 6/2016 | Park |
| 2016/0204307 A1 | 7/2016 | Robin |
| 2016/0223842 A1 | 8/2016 | Yun et al. |
| 2016/0253831 A1 | 9/2016 | Schwarz |
| 2016/0261142 A1 | 9/2016 | Park |
| 2016/0270176 A1 | 9/2016 | Robin |
| 2016/0270187 A1 | 9/2016 | Robin |
| 2016/0276328 A1 | 9/2016 | Robin |
| 2016/0299354 A1 | 10/2016 | Shtukater |
| 2017/0023793 A1 | 1/2017 | Shtukater |
| 2017/0042480 A1 | 2/2017 | Gandhi |
| 2017/0168322 A1 | 6/2017 | Toner |
| 2017/0188848 A1 | 7/2017 | Banet |
| 2017/0189699 A1 | 7/2017 | Dellamano |
| 2017/0231337 A1 | 8/2017 | Anderson |
| 2017/0234818 A1 | 8/2017 | Jesme |
| 2017/0255026 A1 | 9/2017 | Rakhyani |
| 2017/0270636 A1 | 9/2017 | Shtukater |
| 2017/0337461 A1 | 11/2017 | Jesme |
| 2017/0371184 A1 | 12/2017 | Shtukater |
| 2018/0036974 A1 | 2/2018 | Hahn et al. |
| 2018/0212313 A1 | 7/2018 | Harper |
| 2019/0074823 A1 | 3/2019 | Der |

FOREIGN PATENT DOCUMENTS

| | | |
|---|---|---|
| WO | 2016014118 A1 | 1/2016 |
| WO | 2016022665 A1 | 2/2016 |
| WO | 2016150630 A1 | 9/2016 |
| WO | 2016195201 A1 | 12/2016 |
| WO | 2019069555 | 7/2018 |

OTHER PUBLICATIONS

Kao, H-L. et al., "DuoSkin: Rapidly Prototyping On-Skin User Interfaces Using Skin-Friendly Materials," ISWC '16, ACM, Sep. 12-16, 2016, 8 pages.

Avestruz, A-T. et al., "Single-Sided AC Magnetic Fields for Induction Heating," 39th Annual Conference of the IEEE, Nov. 10-13, 2013, pp. 5052-5057.

Chronos Vision GmbH, "Scleral Search Coils 2D/3D," 4 pages, [Online][Retrieved Feb. 28, 2019], Retrieved from the internet <http://www.chronos-vision.de/downloads/CV_Product SSC.pdf>.

Kenyon, R.V., "A soft Contact Lens Search Coil for Measuring Eye Movements," Vision Research, vol. 25, No. 11, pp. 1629-1633.

Lupu, R.G. et al., "A Survey of Eye Tracking Methods and Applications," Gheorghe Asachi Technical University of Iasi, Aug. 29, 2013, pp. 71-86.

Umraiya, A, "Design of Miniaturized Coil System Using Mems Technology for Eye Movement Measurement," McGill University, Montreal, Aug. 2009, pp. i-69.

* cited by examiner

STRONG COUPLING

WEAK COUPLING

EYE-MOUNTED DISPLAYS INCLUDING EMBEDDED CONDUCTIVE COILS

BACKGROUND

1. Technical Field

This disclosure relates generally to eye-mounted displays and, more particularly, to conductive coils embedded in eye mounted displays.

2. Description of Related Art

Augmented reality (AR) adds computer-generated information to a person's view of the world around them. One type of AR system includes an electronic contact lens, for instance using tiny video projectors (or "femtoprojectors") as described in Deering (U.S. Pat. No. 8,786,675). Generally, electronic contact lenses can't accommodate batteries of sufficient capacity to power the electronic contact lenses for very long. Accordingly, providing power to the electronic contact lenses wirelessly is an attractive alternative.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

Figure 1:
FIG. 1 is an illustration of user wearing an augmented reality system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Overview

An augmented reality system can include an electronic contact lens with small projectors, such as femtoprojectors, to display virtual images to a user. The projectors project images onto the user's retina that are combined with external light passing through the electronic contact lens from the user's environment. This enables a user to view virtual images within the real world.

A high quality AR experience requires sufficient power to be provided to the electronic contact lens. A user's AR experience can also be improved if the orientation of the electronic contact lens relative to the user or other frame of reference is known. For instance, the AR system can implement eye tracking functionality using the orientation of the electronic contact lens.

The AR system includes a power source (such as a wearable necklace) that generates a time-varying magnetic field. The time-varying magnetic field induces a time-varying current in conductive coils embedded in the electronic contact lens. The electronic contact lens uses the induced current to produce power for the electronic contact lens and to determine the orientation of the contact lens.

The orientation of the embedded conductive coils relative to the direction of the time-varying magnetic field affects the amount of current produced within the embedded conductive coils by the time-varying magnetic field. As a wearer of an electronic contact lens looks around her environment, her head and eyes move such that the orientation of the embedded coils changes relative to the direction of the time-varying magnetic field. Consequently, the magnitude of current generated by each embedded coil changes based on the user's head and eye movement.

An electronic contact lens can include various configurations of embedded conductive coils to improve the range of orientations of the contact lens relative to the direction of the time-varying magnetic field that produce sufficient power. Each embedded conductive coil defines a plane. The range of orientations in which an embedded pair of conductive coils can produce sufficient power in the presence of a time-varying magnetic field is greater if the planes defined by the pair of embedded conductive coils are not parallel than if the planes are parallel.

The number of embedded conductive coils, and the positions and orientations of the embedded conductive coils within the electronic contact lens can vary. For example, in various contact lenses, one or more embedded conductive coils can be concentric with the outer edge of a contact lens, can form an annulus within the contact lens, or can form a loop encircling the pupil of the eye. Various examples of embedded conductive coils within a contact lens are described below.

Electronic Contact Lens Architecture

Turning now to the figures, FIG. 1 is an illustration of user wearing an augmented reality system. The augmented reality system 100 includes a wireless power source and an electronic contact lens 120 ("contact lens") with an image source, such as one or more femtoprojectors. In addition to providing power to the contact lens 120, the power source can also transmit data to and receive data from the necklace.

In the illustrated example, the power source is a necklace 110. The contact lens 120 projects images onto the retina of the wearer to create an augmented reality, such as images wirelessly received from the necklace 110. Additionally, the contact lens 120 can provide motion and orientation information to the necklace 110.

The AR system of FIG. 1 may feel natural to the wearer because the contact lenses 120 and the necklace 110 are similar to normal contacts lenses and necklaces used in everyday life. For example, the contact lenses 120 may also function as regular contact lenses that provide refractive eyesight correction and the necklace 110 may be designed to look like ordinary jewelry. The necklace 110 may include additional hardware elements within its band 130 that can provide added functionality to the AR system. For example, the necklace can communicatively couple to a smartphone, can receive image data or other information from an application running on the smartphone, and can provide power generation data to the application from display by the smartphone. The necklace may also replace the smartphone rather than merely communicate with it.

As illustrated in FIG. 1, the power source is a necklace 110 that generates a time-varying magnetic field ("TVMF") and that can inductively couple to the contact lens 120. In other embodiments the power source may be any other type of device. For example, in some cases, the power source can be integrated into another type of wearable device such as a necktie, a scarf, a belt, the brim of a hat, the collar of a shirt, the hood of a jacket, the sleeve of a sweater, the front of a t-shirt, etc. In other examples, the power source can be an external device or structure. As an example, the power source can be a smart phone, a table-top box, or a power source coupled to the walls of an office.

Figure 2:
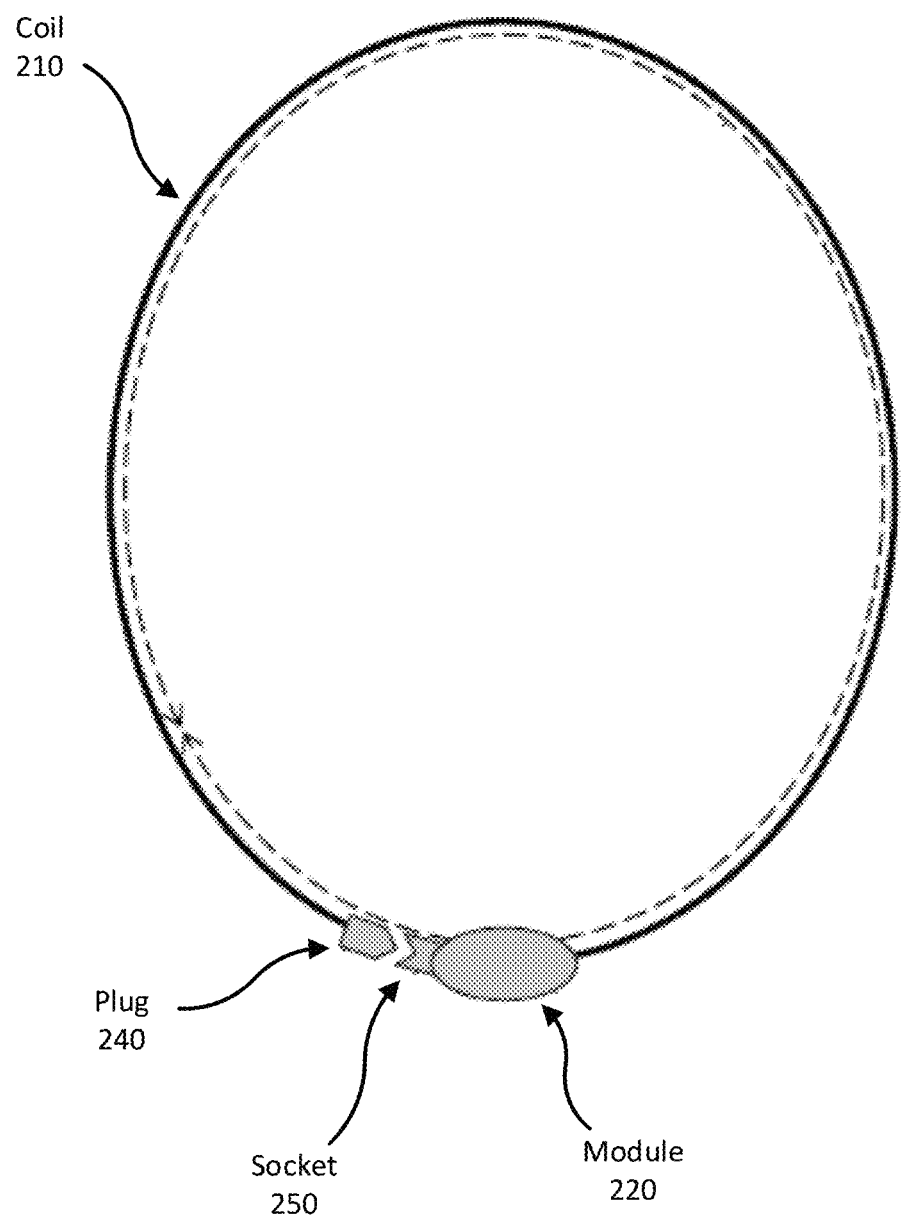
FIG. 2 is an illustration of a necklace of an augmented reality system.

FIG. 2 is an illustration of a necklace 110 of an augmented reality system 100. In the illustrated embodiment, the necklace 110 includes an electronic module 220 and a coil 210 of conductive material. The coil can be connected or disconnected with a plug 240 and a socket 250, or may be a single band without the plug and socket.

The necklace 110 includes various hardware elements, for instance within the electronic module 220, that enable functionality of the AR system 100. For example, the necklace 110 can include hardware elements that generate a TVMF for transferring power to the contact lens 120. Additionally, the hardware elements can include one or more of: a power source such as a battery; a modulator to drive a radio-frequency current in the necklace coil that can be used to inductively couple to and communicate with the contact lens 120; a data modem to encode data on the radio-frequency signal; sensors such as microphones, cameras, inertial sensors, and GPS receivers; a cellular radio; a Wi-Fi radio; a Bluetooth radio; a graphics processing unit; and a microprocessor and memory. In various configurations, the hardware elements can be included in module 220 and/or may be distributed about the necklace band 130. Alternatively, when the AR system 100 is connected to an external device or structure, any of the sensors, processors and other components mentioned above may be located in the device or structure.

Figure 3:
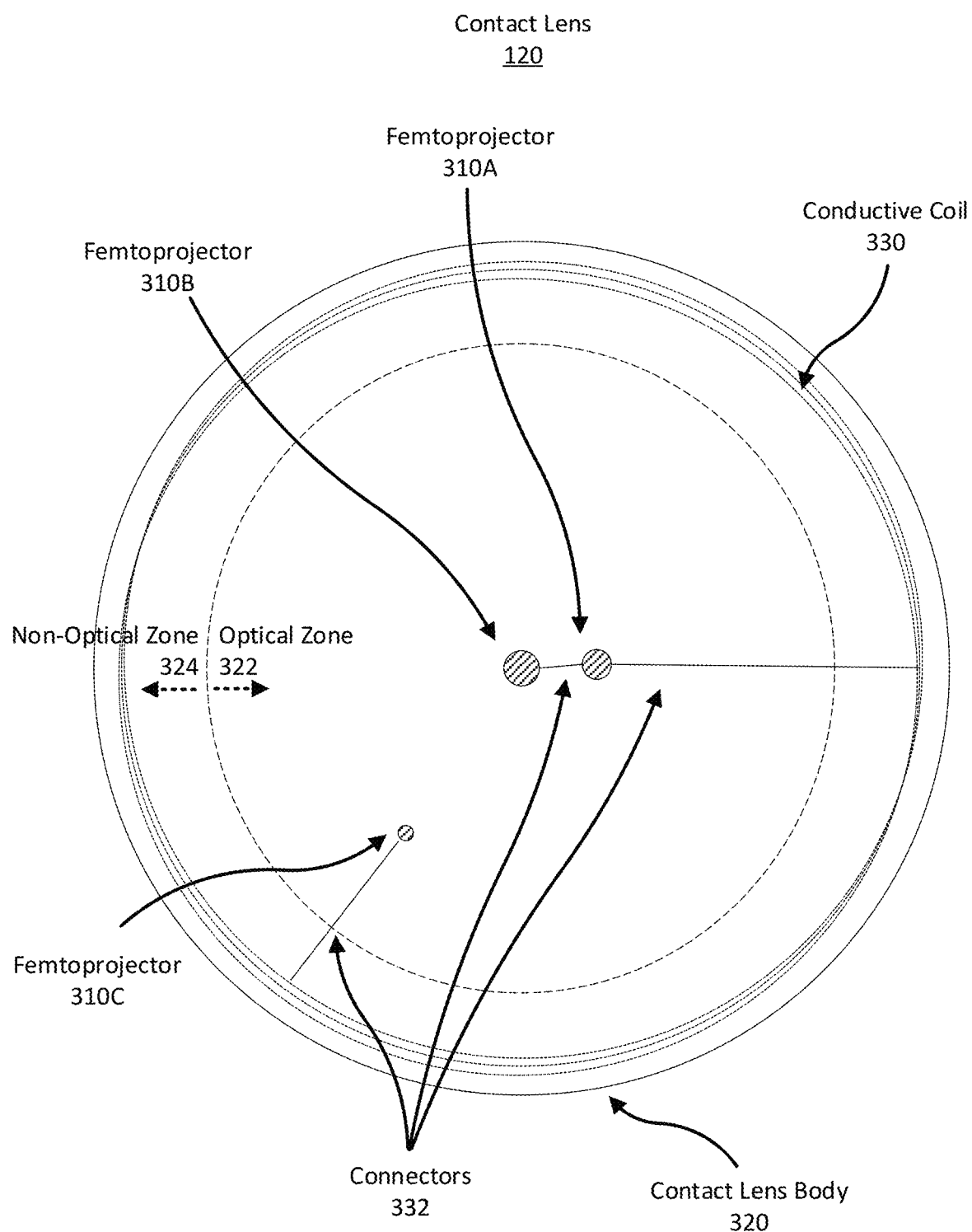
FIG. 3 is a plan view of an electronic contact lens for an augmented reality system.

FIG. 3 is an illustration of an eye 300 wearing a contact lens 120 of an AR system 100. The contact lens 120 includes a femtoprojector 310 mounted in a contact lens body 320, and a conductive coil 330 near the edge of the contact lens body 320 for receiving power and/or data wirelessly from the necklace 110. In various configurations the conductive coil 330 may be embedded in the contact lens body 320 or coupled within or to a surface of the contact lens body. The femtoprojector 310 may include electronics for harvesting power from the conductive coil 330 in the contact lens body 320, processing data transmitted to the contact lens 120, and driving an image source inside the femtoprojector 310. For example, the contact lens 120 can include a energy harvesting circuit connected to the conductive coil 330 such that when the conductive coil 330 generates a time-varying current ("TVC"), the energy harvesting circuit converts the TVC into power for the contact lens 120.

FIG. 3 shows a plan view of a contact lens 120 with multiple femtoprojectors 310A-310C. More specifically, FIG. 3 shows three femtoprojectors 310A-C in the contact lens body 320, but in other embodiments, the contact lens can include many femtoprojectors (e.g., 25, 50, etc.), or can include as few as one femtoprojector. If there is only one femtoprojector 310 in a contact lens body 320, it need not be in the center of the lens. The conductive coil 330 is connected to the femtoprojectors 310 and other electronics via embedded connectors 332. The femtoprojectors 310 are located in a central region of the contact lens 120 which is surrounded by the conductive coil 330.

The display of the contact lens 120, made up of all the femtoprojectors 310, may be a variable resolution display that generates the resolution that each region of the eye can actually see, vastly reducing the total number of individual "display pixels" required compared to displays of equal resolution and field of view that are not eye-mounted. For example, a 400,000 pixel eye-mounted display using variable resolution can provide the same visual experience as a fixed external display containing tens of millions of discrete pixels.

The contact lens body 320 is roughly divided by the dashed circle into an optical zone 322 and a non-optical zone 324. Components in the optical zone 322 may be in the optical path of the eye 300, depending on how far open the iris is. Components in the non-optical zone 324 fall outside the aperture of the eye 300. Accordingly, active optical elements are generally positioned in the optical zone 322 and non-active optical elements are generally positioned in the non-optical zone 324. For example, femtoprojectors 310 are within the optical zone 322 while the conductive coil 330 is in the non-optical zone 324. Additionally, the contact lens body 320 may also contain other components positioned in the non-optical zone 322 for data processing, data transmission, and power recovery and/or positioning.

The contact lens 120 can also include other components such as antennae or optical/infrared photodetectors, data storage and buffering, controls, and a calibration system (including, for instance, a motion detection system and a display shift system). In addition, the contact lens 120 can include positioning components such as accelerometers, magnetometers, and gyroscopes used for motion detection, eye tracking, and head tracking. Finally, the contact lens 120 can also include data processing components, such as microprocessors, microcontrollers, and other data processing elements.

Eye Motion and Generated Time-Varying Current

As described above, a power source is inductively coupled to a conductive coil within a contact lens 120 via a TVMF. The magnitude of the induced TVC within the conductive coil of the contact lens (a "receiver conductive coil") depends on the relative orientation between the conductive coil and the direction of the TVMF. The receiver conductive coil may be embedded in a contact lens 120. Take, for example, a power source which is a conductive coil that generates a TVMF (a "source coil"). In this example, the source conductive coil and receiver conductive coil are strongly coupled when the planes defined by the source conductive coil and receiver conductive coil are parallel and weakly coupled when the planes are orthogonal. The receiver conductive coil generates a greater magnitude TVC when the source conductive coil and receiver conductive coil are strongly coupled than when they are weakly coupled. Additional factors can also affect the coupling between two conductive coils, such as the distance between coils, mutual inductance between coils, and the like.

Figure 4:
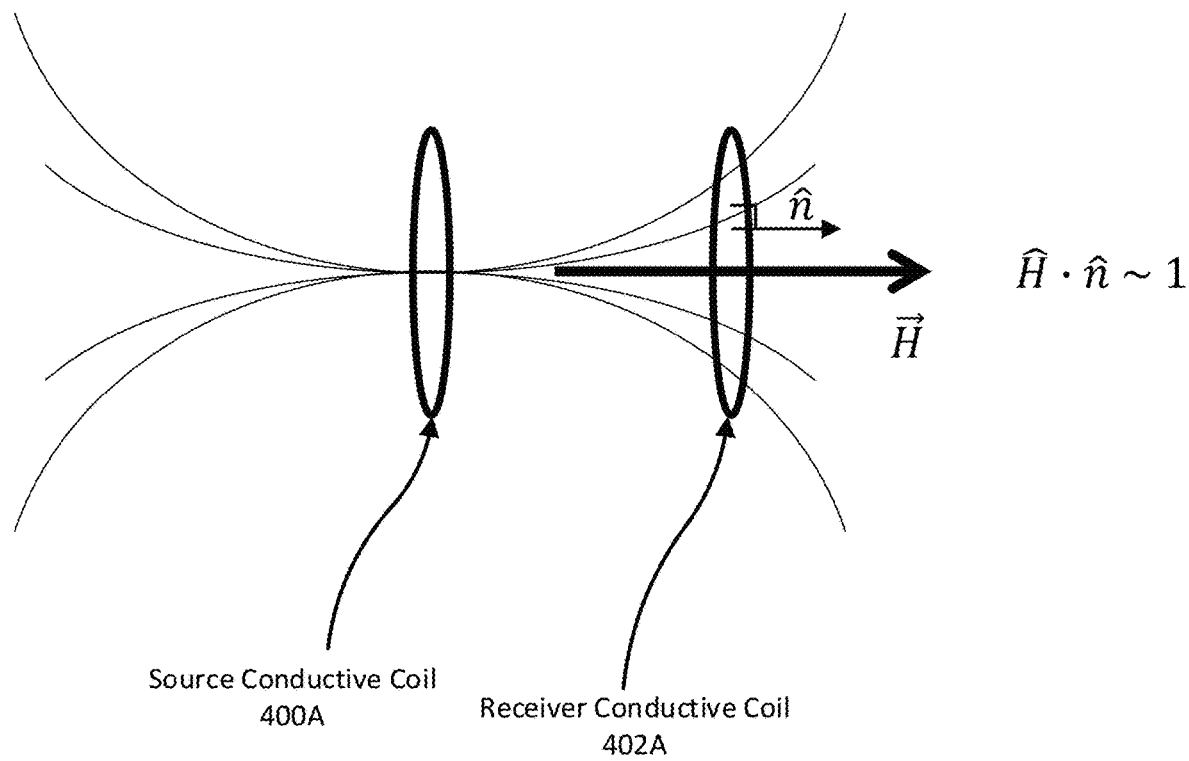
FIG. 4 is a diagram illustrating a strong inductive coupling and a weak inductive coupling between a source coil and a receiver coil.
Figure 4:
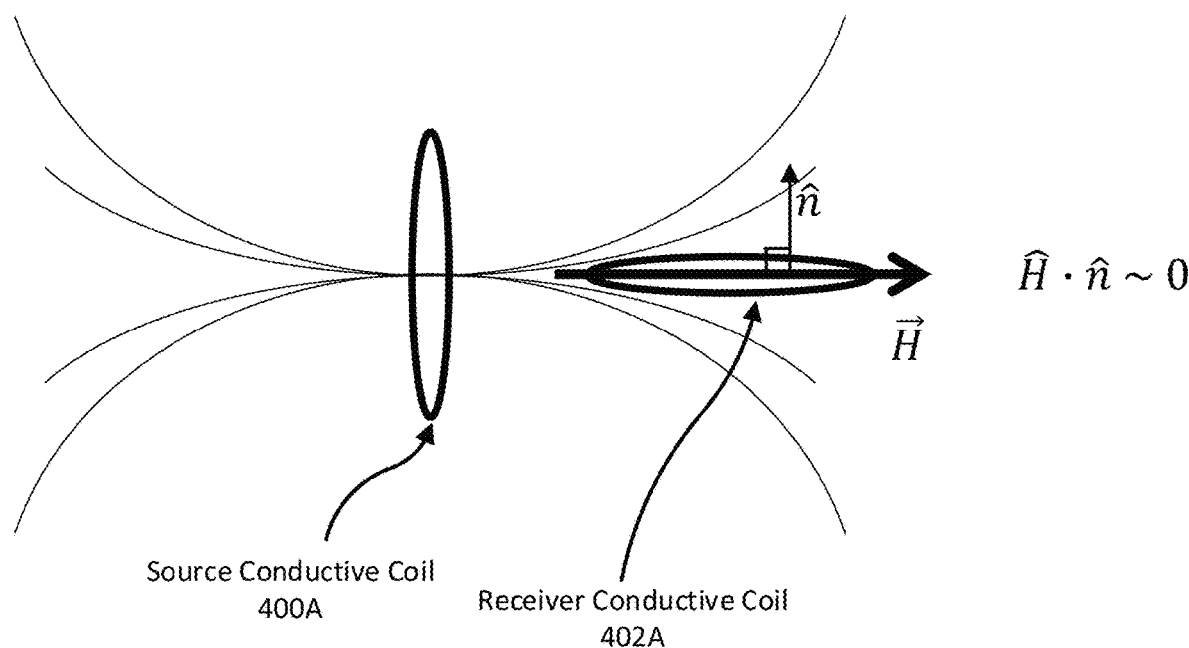

To illustrate, FIG. 4 is a diagram illustrating a strong inductive coupling and a weak inductive coupling between a source conductive coil and a receiver conductive coil. Strong inductive coupling is shown between a first source conductive coil 400A and a first receiver conductive coil 402A. The first source conductive coil 400A generates a TVMF in a direction indicated by the vector $\vec{H}_A$. The vector $\vec{H}_A$ is orthogonal to the plane defined by the first receiver conductive coil 402A. Stated differently, the unit vector $\hat{n}_A$ that is orthogonal to the plane defined by the first receiver conductive coil 402A is parallel to the vector $\vec{H}_A$. As a result, the inductive coupling between the first source conductive coil 400A and the first receiver conductive coil 402A, represented by the dot product $\hat{H}_A \cdot \hat{n}_A \sim 1$, is a strong coupling, where $\hat{H}_A$ is the unit vector in the direction of $\vec{H}_A$.

Weak inductive coupling illustrated by FIG. 4 is shown between a second source conductive coil 400B and a second receiver conductive coil 402B. The second source conductive coil 400B generates a TVMF in a direction indicated by the vector $\vec{H}_B$. The vector $\vec{H}_B$ is parallel to the plane defined by the second receiver conductive coil 402B. Stated differently, the unit vector $\hat{n}_B$ that is orthogonal to the plane defined by the second reciprocal conductive coil 402B is orthogonal to the vector $\vec{H}_B$. As a result, the inductive coupling between the second source conductive coil 400B and the second receiver conductive coil 402B, represented by the dot product $\hat{H}_B \cdot \hat{n}_B \sim 0$, is a weak coupling.

Thus, a strong coupling is a coupling between conductive coils in which the angle θ between the direction of the TVMF produced by a first conductive coil and a vector orthogonal to a second conductive coil is zero or close to zero (e.g., 20 degrees or less, 10 degrees or less, and the like), and results in the generation of an increased magnitude of TVC relative to a weak coupling. Likewise, a weak coupling is a coupling between conductive coils in which the angle θ between the direction of the TVMF produced by a first conductive coil and a vector orthogonal to a second conductive coil is 90 degrees or close to 90 degrees (e.g., 70 degrees or more, 80 degrees or more, and the like), and results in the generation of a reduced magnitude of TVC relative to strong coupling.

Referring back to FIG. 1, the necklace 110 (i.e., a source coil) can generate a TVMF, and can transmit power and/or data to a conductive coil 330 embedded in the contact lens 120 (i.e., an embedded receiver coil) via inductive coupling. Generally, the necklace 110 is worn around a user's neck during operation of the AR system 100. As a result, the direction of the TVMF produced by the necklace 110 is generally consistent, and the strength of coupling between a contact lens worn by a wearer of the necklace and the necklace itself varies as the orientation of the contact lens relative to the necklace varies. Therefore, the magnitude of the generated TVC varies as the orientation of the contact lens 120 varies.

Figure 5A:
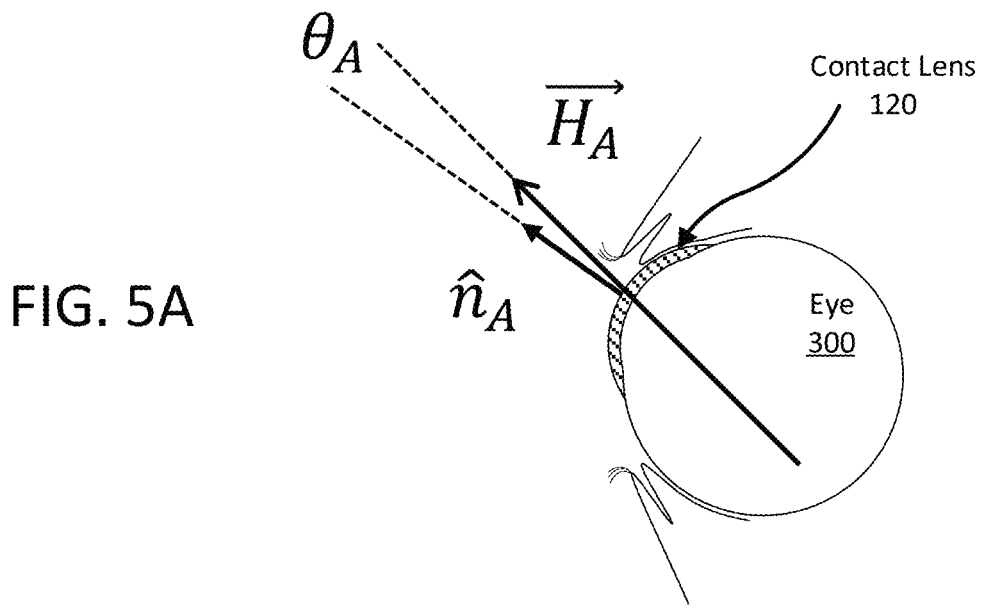
FIGS. 5A-5C show various orientations of an eye wearing an electronic contact lens in the presence of a magnetic field as the eye moves within the eye socket.
Figure 5B:
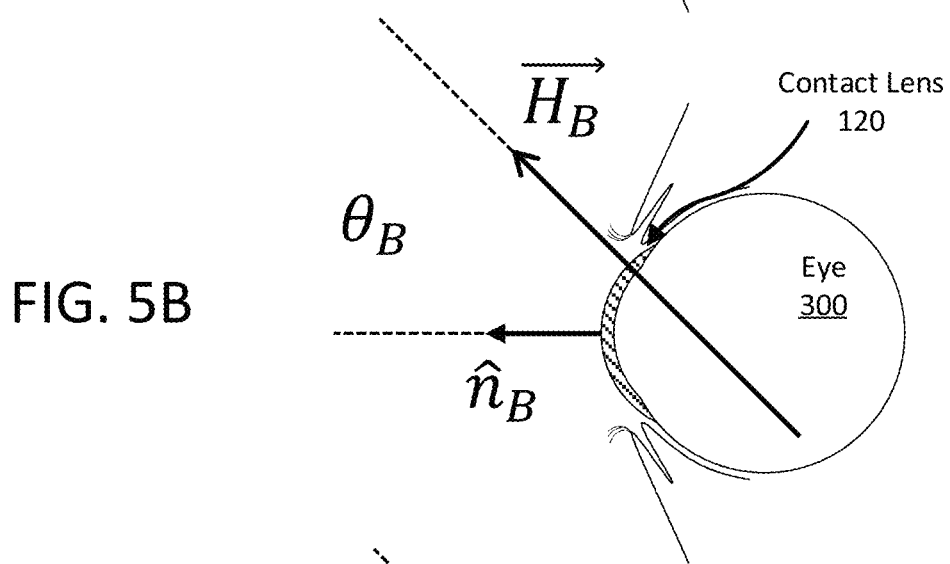
Figure 5C:
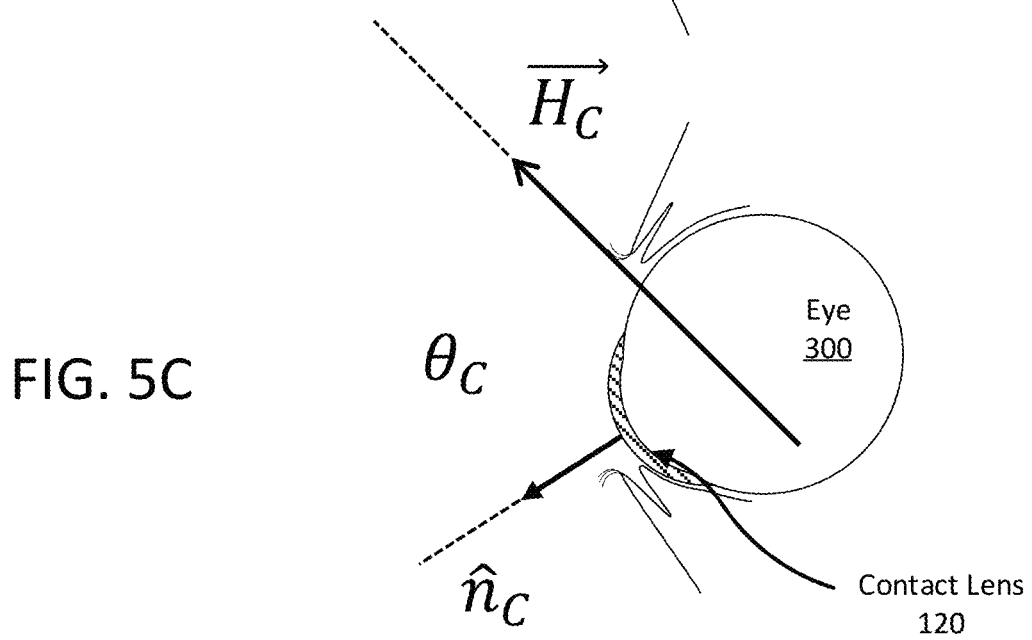

FIGS. 5A-5C show various orientations of an eye 300 wearing an electronic contact lens 120 in the presence of a TVMF as the eye moves within the eye socket. In the example of FIG. 5A, an eye 300 is looking upwards, and the angle between the direction of the TVMF $\vec{H}_A$ produced by a necklace 110 and the vector $\hat{n}_A$ orthogonal to the plane defined by an embedded conductive coil $\theta_A$. Here, because $\hat{n}_A$ and $\vec{H}_A$ are nearly parallel, the contact lens 120 is strongly coupled to the source and the embedded conductive coil generates an amount of TVC $I_A$.

In the example of FIG. 5B, an eye 300 is looking forwards, and the angle between the direction of the TVMF $\vec{H}_B$ produced by a necklace 110 and the vector $\hat{n}_B$ orthogonal to the plane defined by an embedded conductive coil is $\theta_B$. In this example, $\hat{n}_B$ and $\vec{H}_B$ are not parallel and are less strongly coupled. Accordingly, the embedded conductive coil generates and amount of TVC $I_B$. Here, because the conductive coils are less strongly coupled than in FIG. 5A, $I_B$ is less than $I_A$.

Finally, in the example of FIG. 5C, an eye 300 is looking forwards, and the angle between the direction of the TVMF $\vec{H}_C$ produced by a necklace 110 and the vector $\hat{n}_C$ orthogonal to the plane defined by an embedded conductive coil is $\theta_C$. In this example, $\hat{n}_C$ and $\vec{H}_C$ are nearly orthogonal and are weakly coupled. The embedded conductive coil of the contact lens generates and amount of TVC $I_C$. In this example, because the two are less strongly coupled than in FIG. 5B, $I_C$ is less than $I_B$ and $I_A$.

Several conductive coils can be embedded within the contact lens 120 (e.g., three or more). The embedded conductive coils are positioned within the contact lens such that the embedded conductive coils produce TVC for a variety of orientations of the user's eye.

Figure 6:
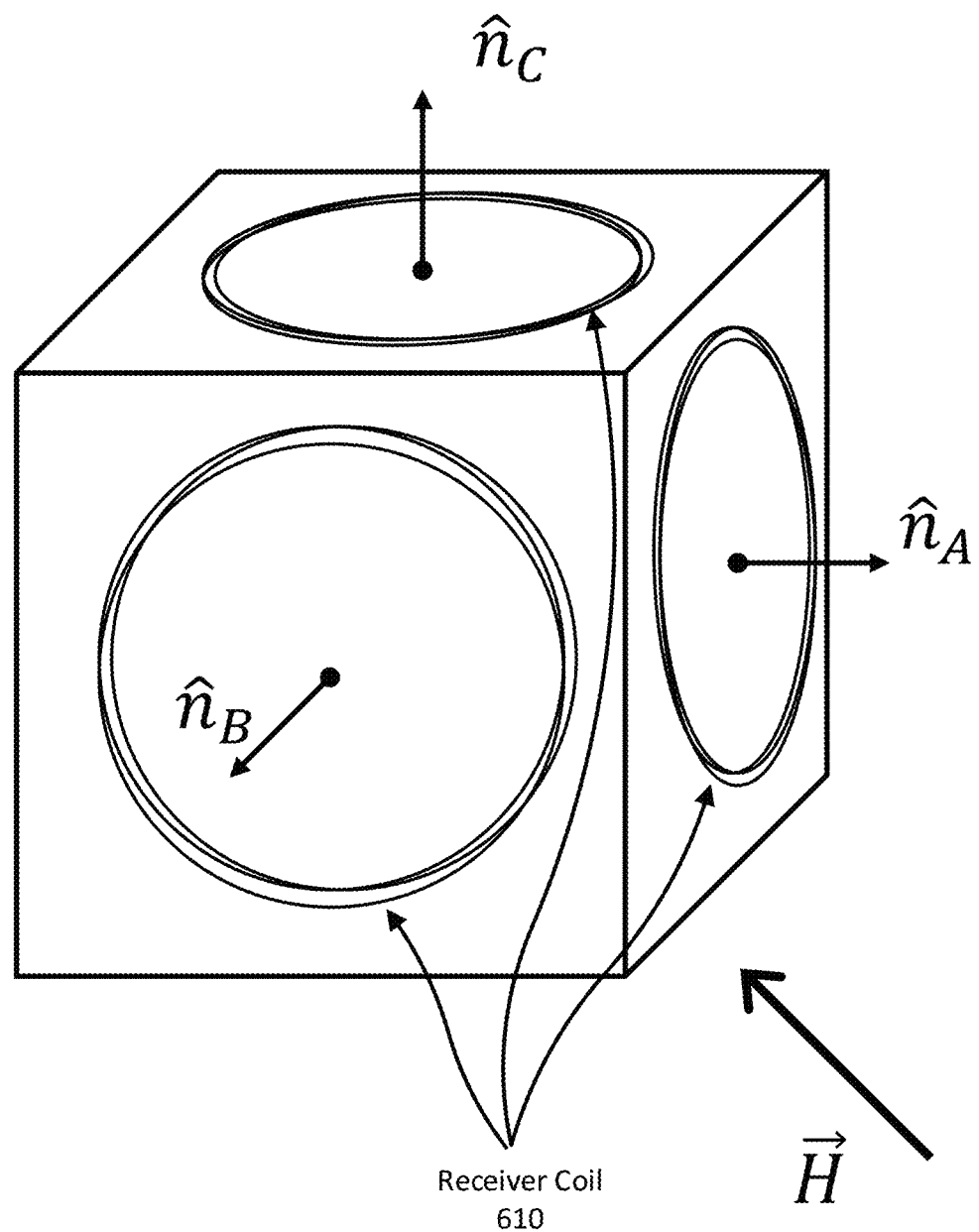
FIG. 6 is a diagram illustrating a combination of conductive coils that generate a time-varying current in the presence of a time-varying magnetic field.

To illustrate this, FIG. 6 is a diagram illustrating a combination of conductive coils that generate a TVC in the presence of a TVMF. Each conductive coil has a unit vector $\hat{n}_i$ that is orthogonal to the other two unit vectors (e.g., $\hat{n}_A \perp \hat{n}_B \perp \hat{n}_C$). In this example, a source generates an arbitrary TVMF $\vec{H}$. Due to their orientations, at no point are all of the planes defined by the three conductive coils orthogonal to $\vec{H}$. That is, for any $\vec{H}$:

$$\hat{H} \cdot \hat{n}_C + \hat{H} \cdot \hat{n}_B + \hat{H} \cdot \hat{n}_C > 0 \qquad (1)$$

The illustrated orientation of the orthogonal receiver conductive coils 610 in FIG. 6 is given as an example to establish the relationship in Equation 1. However, fabricating a contact lens 120 with three orthogonal embedded receiver coils is a challenging engineering problem and, in many cases, embedded receiver coils in the contact lens may be alternatively positioned. Still, Equation 1 holds for contacts lenses having any arrangement of a set of three receiver coils such that no two of the set of receiver coils define parallel planes (e.g., no two of $\hat{n}_A$, $\hat{n}_B$, and $\hat{n}_C$ are parallel). Such a set of receiver coils is referred to herein as a non-parallel set of receiver coils, and the set of planes defined by the non-parallel set of receiver coils is referred to herein as a non-parallel set of planes. In some embodiments, a contact lens may also include one or more additional receiver coils. Each of the additional receiver coils defines an additional plane. The additional receiver coils may be positioned such that an additional plane may be parallel or non-parallel to any plane of the non-parallel set of planes.

More generally, a contact lens 120 can include an orientation estimation circuit connected to the conductive coils 330 within the contact lens 120. The orientation estimation circuit receives TVCs generated by the embedded conductive coils and estimates an orientation of the contact lens 120 based on the TVCs. For instance, the orientation estimation circuit can determine an orientation estimate of the contact lens 120 relative to a wearer of the contact lens, relative to a power source, relative to an external object, or relative to a reference plane or position. The orientation estimate can be represented by a three-dimensional vector. As such, the orientation estimation circuit estimates the three-dimensional vector based on the TVCs generated from each of the conductive coils. For example, the orientation estimation circuit may estimate the three-dimensional orientation vector by summing, for each coil, the vector representative of the orientation of the coil and the magnitude of the TVC produced by the coil. In other cases, the orientation estimation circuit can estimate the orientation using various other methods and information.

Contact Lenses With Embedded Conductive Coils

Figure 7A:
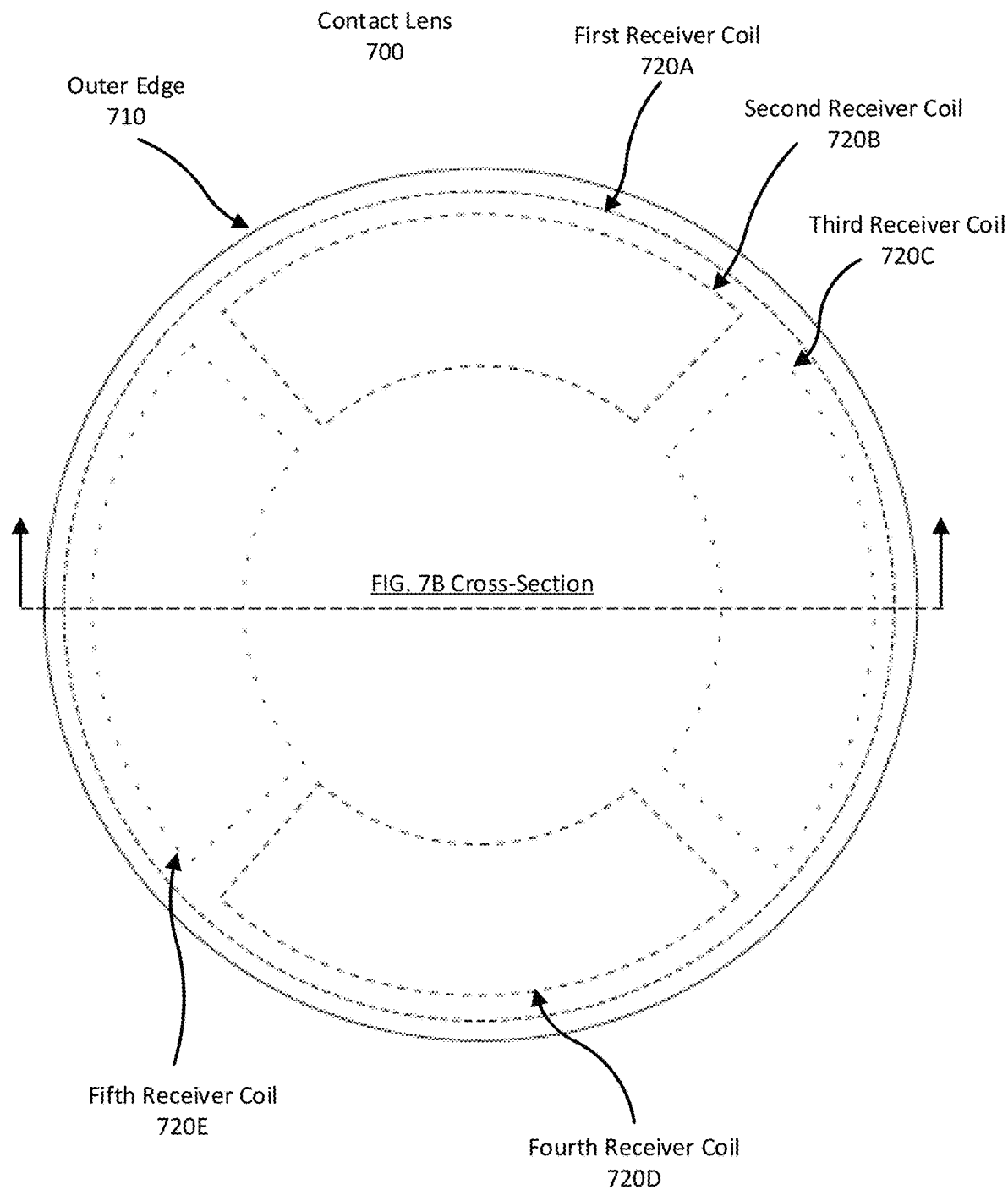
FIGS. 7A-7C illustrate various views of a contact lens including five conductive coils that generate a time-varying current from a time-varying magnetic field.
Figure 7B:
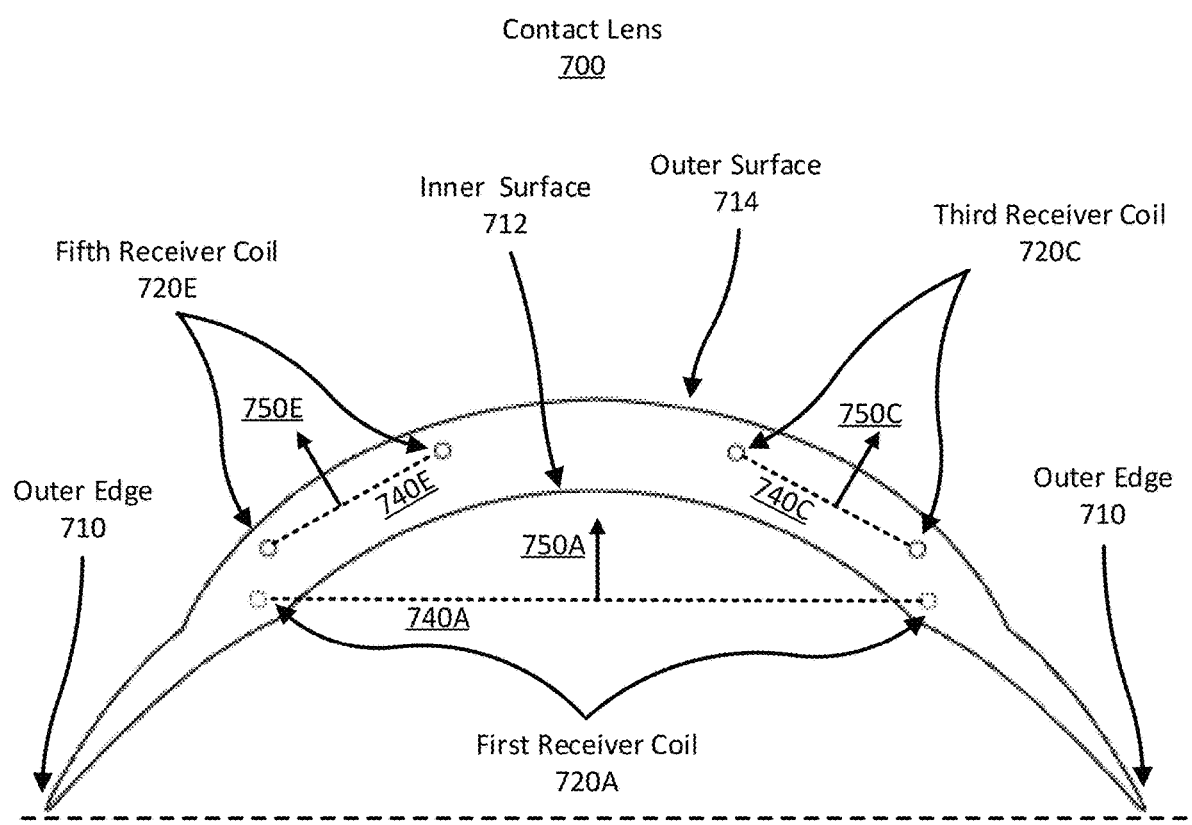
Figure 7C:
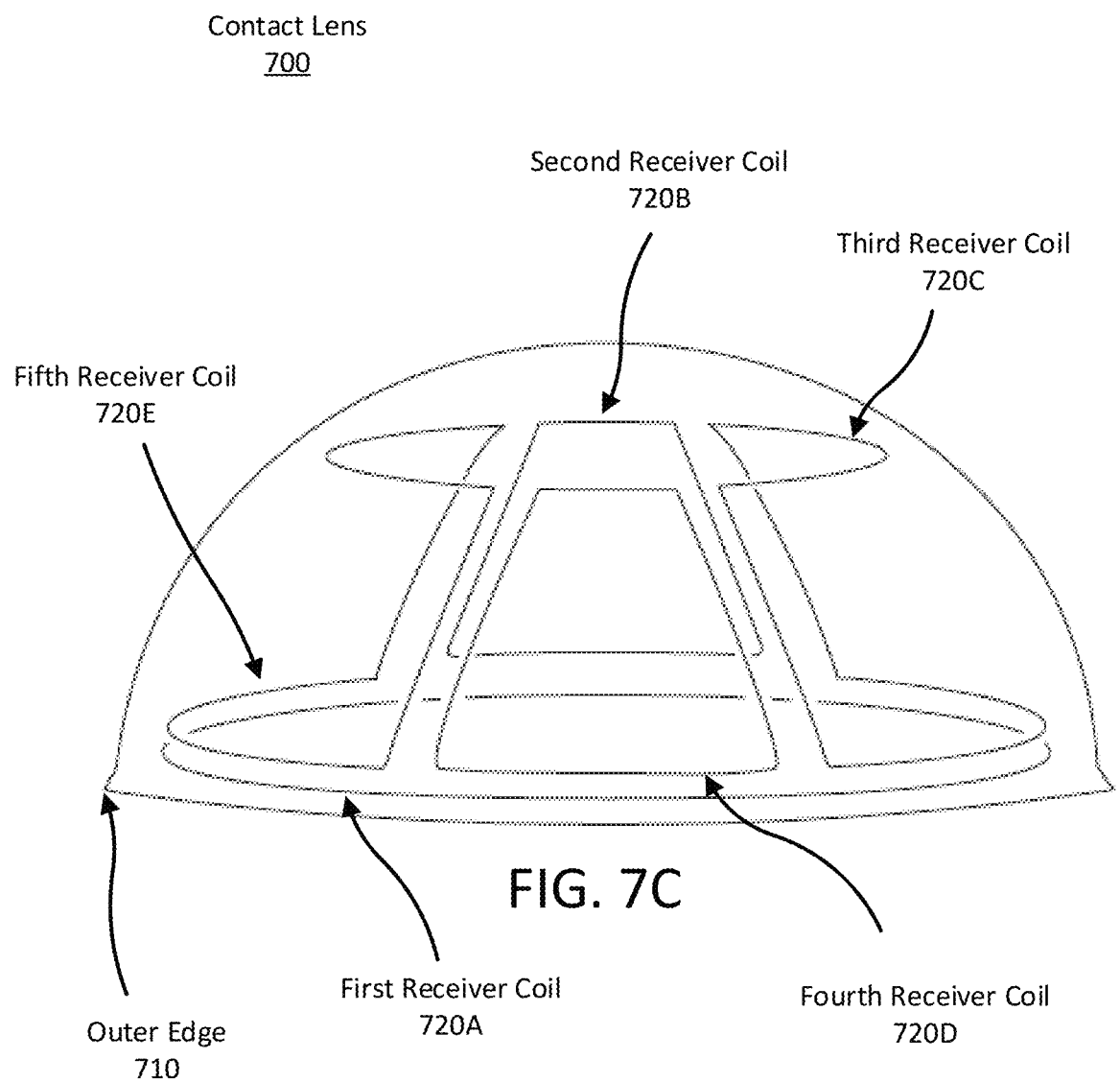

There can be any number of orientations for a set of non-parallel conductive coils ("receiver coils") in a contact lens. FIGS. 7A-7C illustrate various views of a contact lens 700 including five receiver coils 720A-E that generate a TVC from a TVMF. FIG. 7A is a plan view illustration of the contact lens 700. The first receiver coil 720A is positioned along the outer edge 710 of the contact lens 700. The second 720B, third 720C, fourth 720D, and fifth 720E receiver coils are positioned between the center of the contact lens 700 and the first receiver coil 720A. In combination, the second 720B, third 720C, fourth 720D, and fifth 720E receiver coils are loops that span an annulus of the contact lens 700. An annulus of a contact lens is a ring shaped portion of the contact lens having an inner perimeter and an outer perimeter. For each receiver coil 720, the portion of the receiver coil along the inner perimeter and the outer perimeter of the annulus are approximately parallel. In this example, each of receiver coils 720B-720E spans approximately 80° of the annulus with approximately a 10° separation between each receiver coil 720. In other examples, each receiver coil 720 may span a different portion of the annulus (e.g., 60°, 90°, 120°, etc.), and the receiver coils 720 may not be symmetric or the same size. Generally, the receiver coils span a portion of an annulus between 110° and 140°.

FIG. 7B illustrates a cross sectional view of the contact lens 700. The contact lens has an inner surface 712 and an outer surface 714. All of the receiver coils 720 are between the inner surface 712 and outer surface 714. Each small circle within the contact lens 700 indicates a cross-section of a receiver coil 720. In this example, the cross-section of the first receiver coil 720A is indicated by circles on each side of the contact lens because it is concentric with the outer edge 710. The third 720C and fifth 720E receiver coils are indicated by two circles that are each on the same side of the contact lens 700.

FIG. 7B also illustrates a representation of the set of non-parallel planes 740 defined by the first 720A, third 720C, and fifth 720E receiver coils. The planes for the second and fourth receiver coils are also a part of the set of non-parallel planes although they are not illustrated. Each plane 740 is represented as a dashed line. Each plane 740 is associated with an orthogonal unit vector 750 and no two of the unit vectors 750 are parallel. Accordingly, in the presence of an arbitrary TVMF $\vec{H}$, the receiver coils 720 of contact lens 700 will generate sufficient current to power the contact lens.

FIG. 7C shows a side view of the contact lens 700. Each of the receiver coils 720 are illustrated within the contact lens 700. The first receiver coil 720A is near the bottom of the hemisphere and is concentric with the outer edge 710. The second 720B, third 720C, fourth 720D, and fifth 720E, receiver coils are shown within the sidewalls of hemisphere. The second 720B, third 720C, fourth 720D, and fifth 720E receiver coils form an annulus.

Figure 8A:
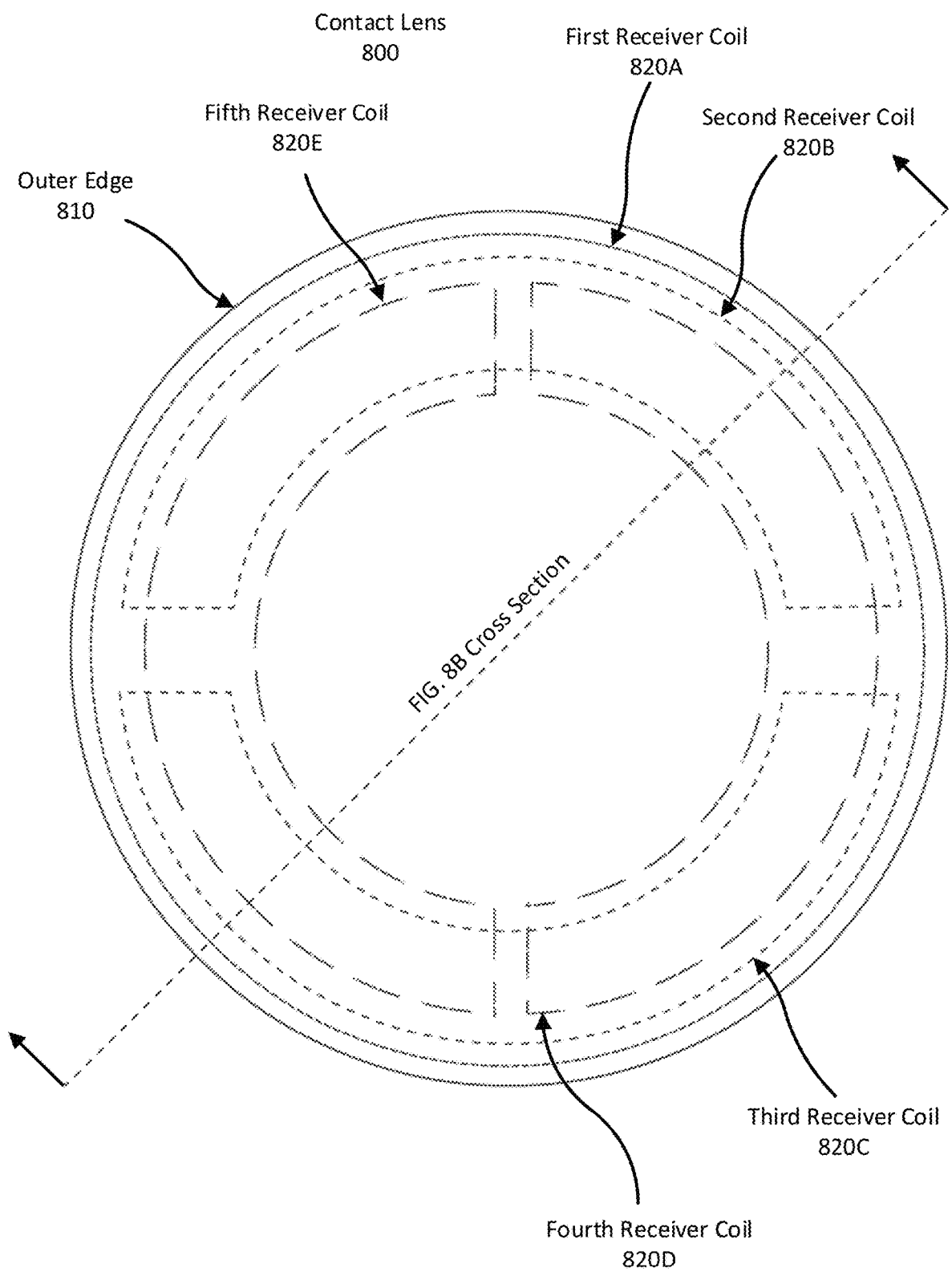
FIGS. 8A-8B illustrate various views of a contact lens including five conductive coils that generate a time-varying current from a time-varying magnetic field.
Figure 8B:
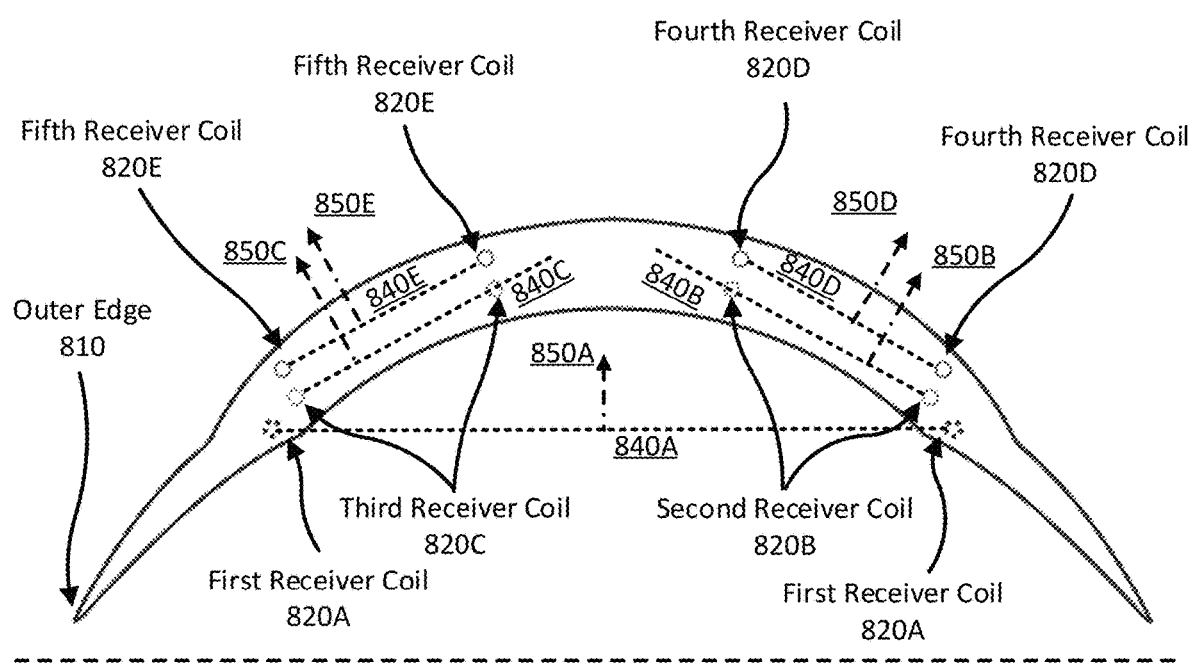

FIGS. 8A-8B illustrate various views of a contact lens 800 including five receiver coils 820A-E that generate a TVC from a TVMF. FIG. 8A is a plan view illustration the contact lens 800. The first receiver coil 820A is positioned along the outer edge 810 of the contact lens 800. In this example, the loops of the second 820B and third 820C receiver coils, in combination, and the loops of the fourth 820D and fifth 820E receiver coils, in combination, each approximate the shape of an annulus. For each of the pair of receiver coils 820B and 820C and the pair of receiver coils 820D and 820E, each receiver coil of the pair spans approximately 170° of the annulus with approximately a 10° separation between each receiver coil of the pair. In this example, the planes defined by the first pair of receiver coils (e.g., 820B and 820C) are rotated by 90° relative to the planes defined by the second pair of receiver coils (e.g., 820D and 820D).

Additionally, a first pair of receiver coils (e.g., the second 820B and third 820C) and a second pair of receiver coils (e.g., the fourth 820D and fifth 820E) are staggered between the first receiver coil 820A and the center of the contact lens 800. That is, the inner radius of the annulus formed by the first pair is nearer the center than the inner radius formed by the second pair, and the outer radius of the annulus formed by the second pair is nearer the first receiver coil 820A than the outer radius of the annulus formed by the first pair.

FIG. 8B illustrates a cross-sectional view of the contact lens 800. In this example, the first through fifth receiver coils 820A-E are all illustrated within the contact lens 800. Here, the second 820B and third 820C receiver coils are embedded nearer the bottom side of the contact lens than the fourth 820D and fifth 820E are embedded nearer the top side of the contact lens. Also shown are a representation of the plane 840 of each receiver coil 820 and the corresponding orthogonal unit vector 850. Here, all five unit vectors 850 correspond to a set of non-parallel planes and, therefore, all of the unit vectors are non-parallel. Notably, as illustrated, some of the unit vectors appear parallel to one another (e.g., 850C is parallel to 850E, and 850B is parallel to 850D). However, given the orientation of the receiver coils in FIG. 8A, each of the illustrated unit vectors has a component that is in to, or out of, the plane of the page such that all of the unit vectors are non-parallel. Thus, for an arbitrary TVMF H, at least one of the receiver coils 820 of contact lens 800 will generate a TVC that can be used to determine an orientation of the contact lens or to generate power.

Figure 9A:
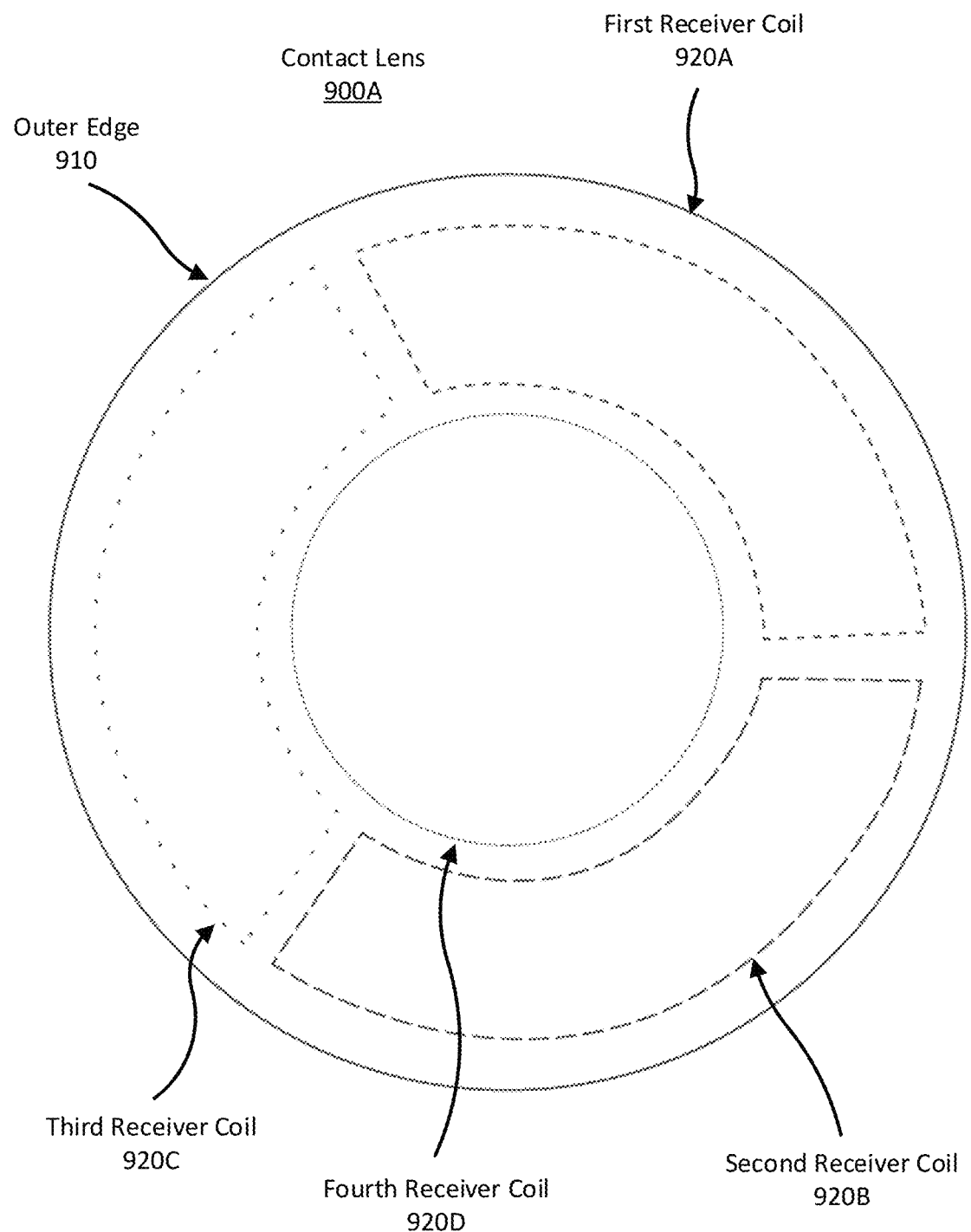
FIGS. 9A-9B illustrate plan views of a contact lens including four conductive coils that generate a time-varying current from a time-varying magnetic field.
Figure 9B:
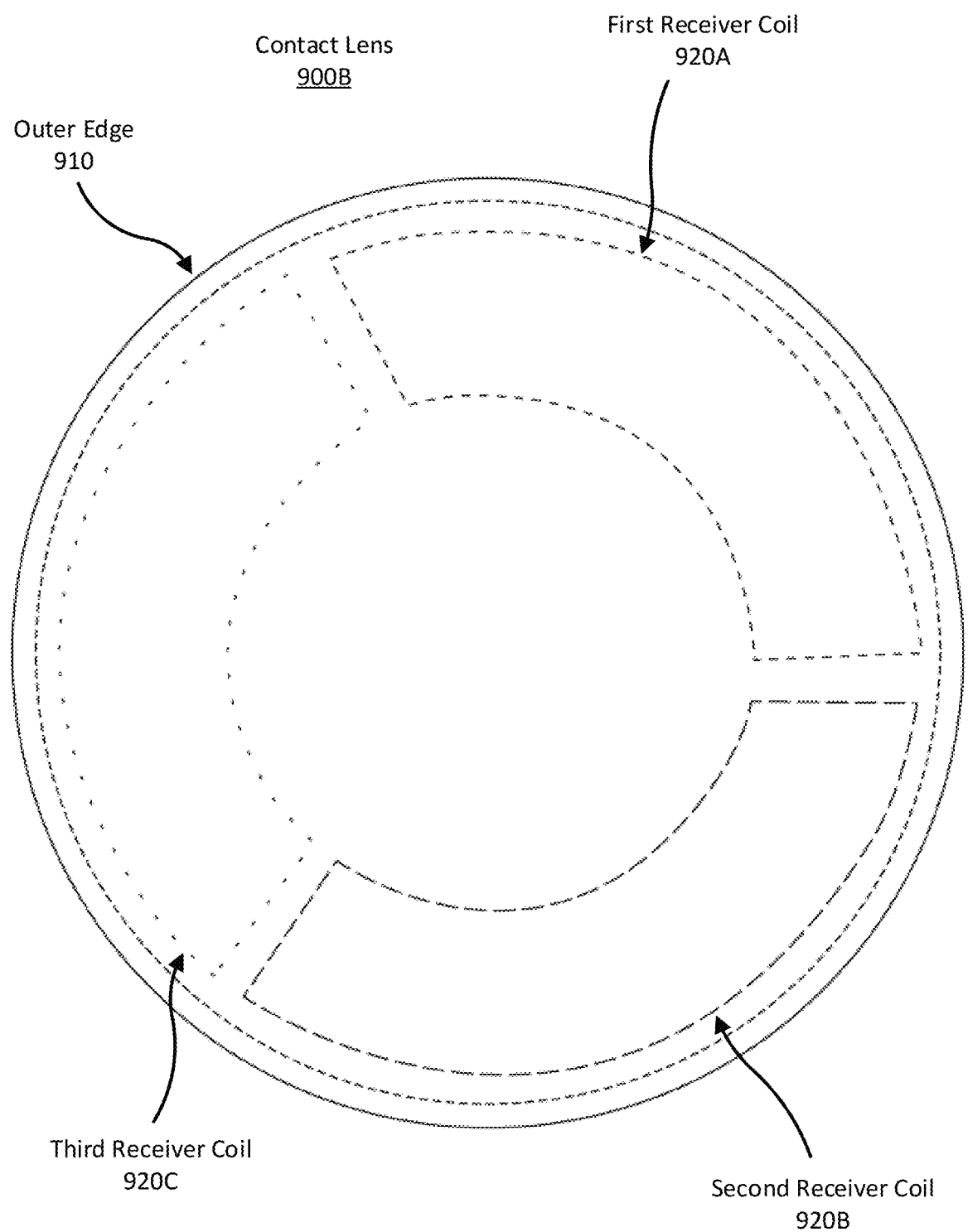

FIGS. 9A-9B illustrate plan views of a contact lens including four receiver coils 920A-D that generate a TVC from a TVMF. FIG. 9A is a plan view illustration of a contact lens 900A with four receiver coils 920A-D. In this example, the first receiver coil 920A is concentric with the outer edge of the contact lens but positioned nearer the center of the contact lens than the second 920B, third 920C, and fourth 920D receiver coils. In this example, the loops of the second through fourth 920B-920D receiver coils approximate, in combination, the shape of an annulus. In this example, each receiver coil 820 is approximately 110° of the annulus with approximately a 10° separation between each receiver coil. FIG. 9B is a plan view illustration of a similar contact lens 900B with the first receiver coil 920A nearer the outer edge of the contact lens 900B than the second through fourth receiver coils 920B-D.

Figure 9C:
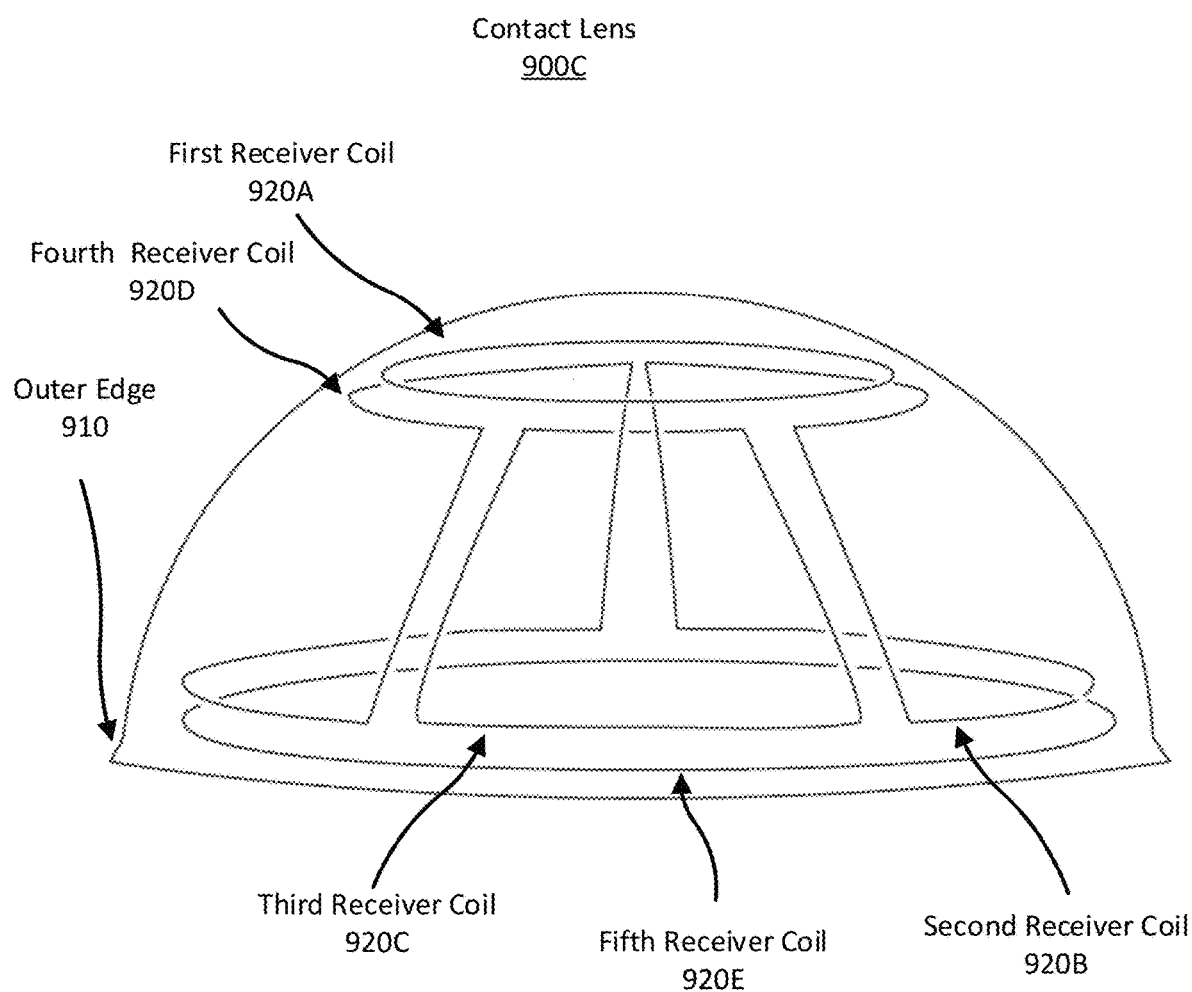
FIG. 9C illustrates a side view of a contact lens including five conductive coils that generate a time-varying current from a time-varying magnetic field.

FIG. 9C illustrates an isometric view of a contact lens 900C including five receiver coils 920A-E that generate a TVC from a TVMF. In this example, the first and fifth receiver coils 920A are both concentric with the outer edge 910 of the contact lens 900C. The first receiver coil 920A is nearer the outer edge 910 than the second through fourth receiver coils 920B-920D and the fifth receiver coil 920E is nearer the center of the content lens 900C than the second through fourth receiver coils 920B-920D. The second through fourth receiver coils 920B-920D form an annulus similar to the contact lens of FIG. 9B.

Figure 10A:
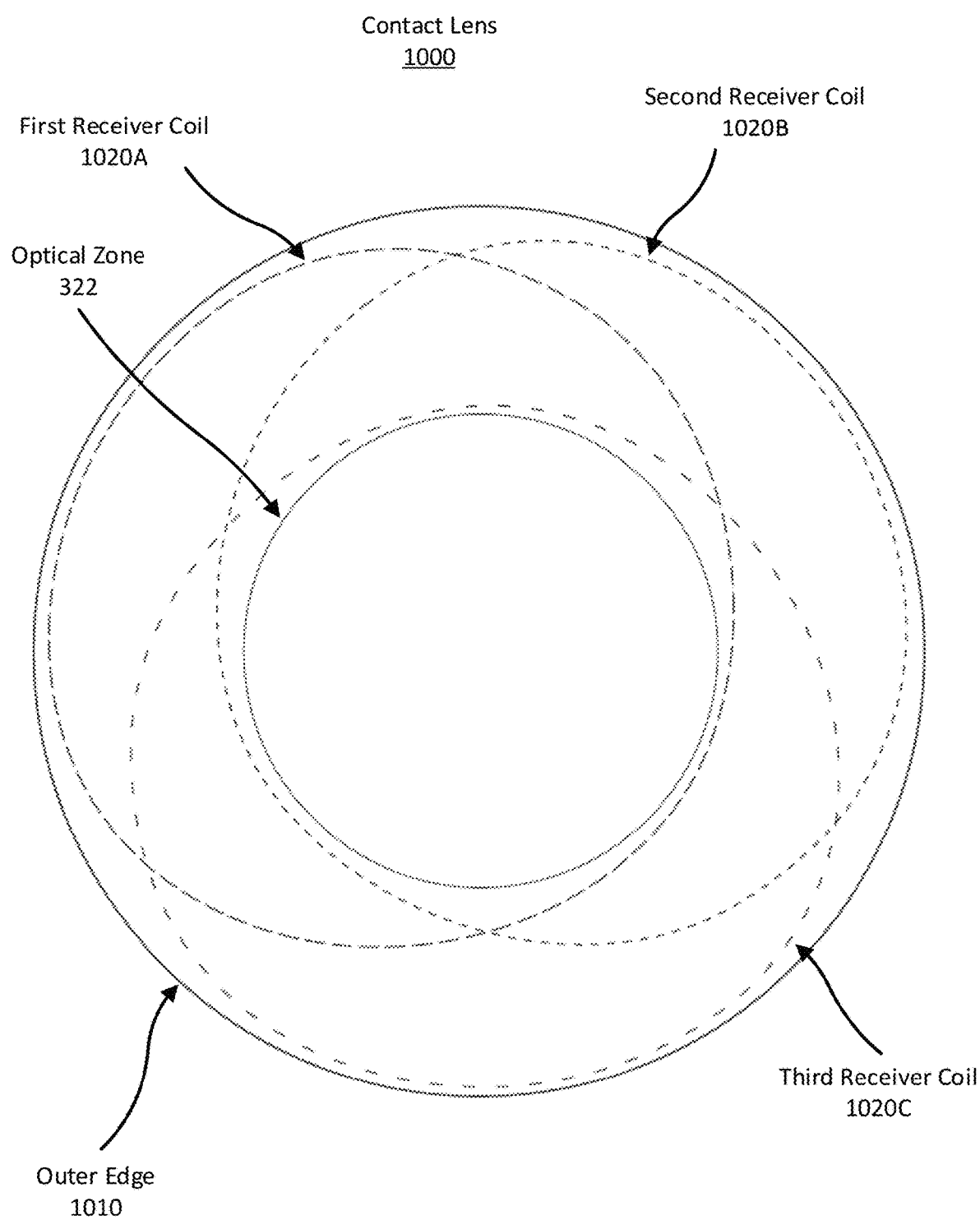
FIGS. 10A-10B illustrate various views of a contact lens including three conductive coils that generate a time-varying current from a time-varying magnetic field.
Figure 10B:
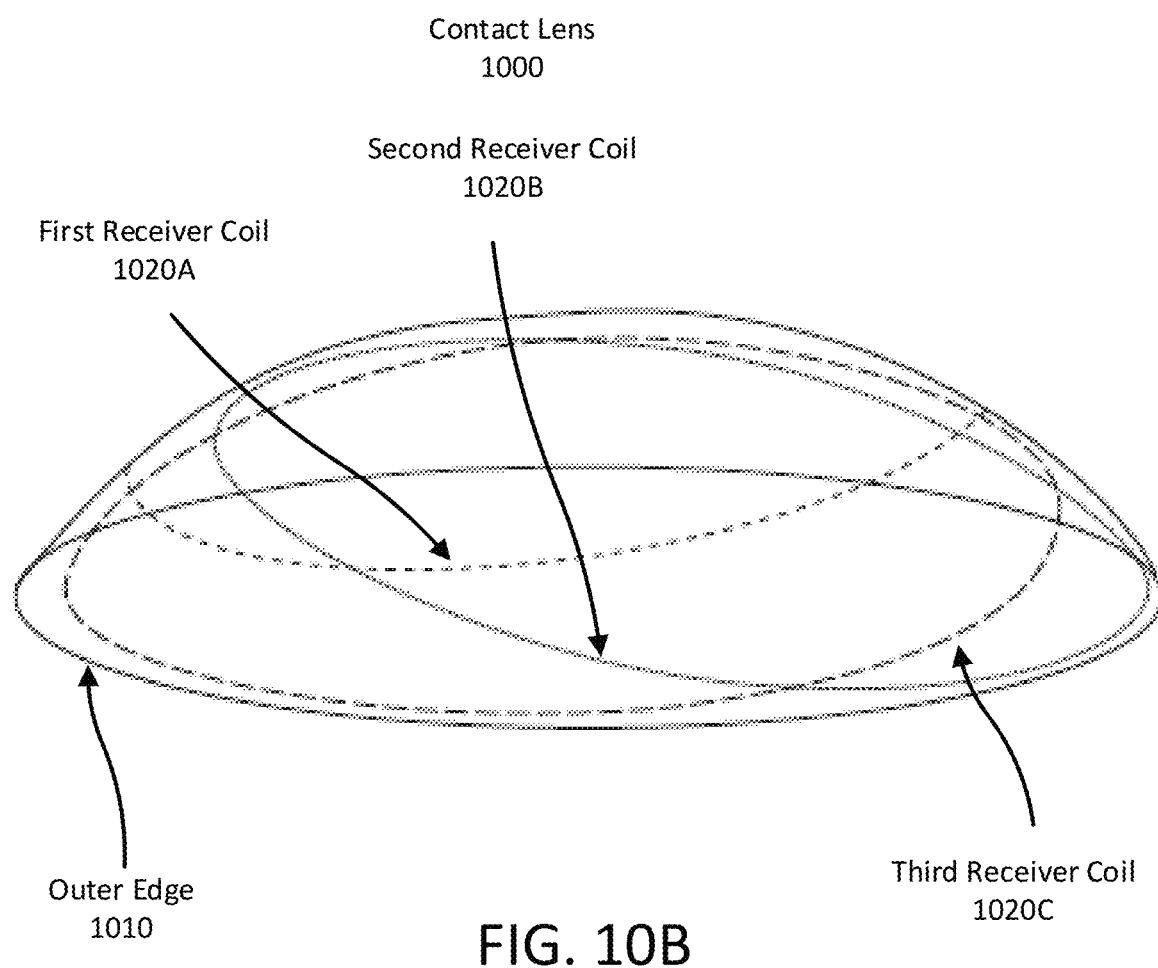

FIGS. 10A-10B illustrate various views of a contact lens 1000 including three receiver coils 1020A-C that generate a TVC from a TVMF. FIG. 10A is a plan view illustration of the contact lens 1000. Each of the receiver coils 1020 is ellipse-shaped where each ellipse extends from the outer edge 1010 of the contact lens 1000 to the edge of the optical zone 322 on the opposite side of the contact lens 1000. While each of the receiver coils are illustrated as an ellipse the coils may take any other shape that encompasses the optical zone 322. That is, as illustrated, each receiver coil is approximately shaped as an ellipse encompassing the optical zone 322 with a major axis extending along a line orthogonal to the outer edge 1010 towards the center of the contact lens 1000. In the illustrated example, the major axis of each ellipse is offset from one another by approximately 120°. FIG. 10B illustrates an isometric view of the contact lens 1000.

Figure 11:
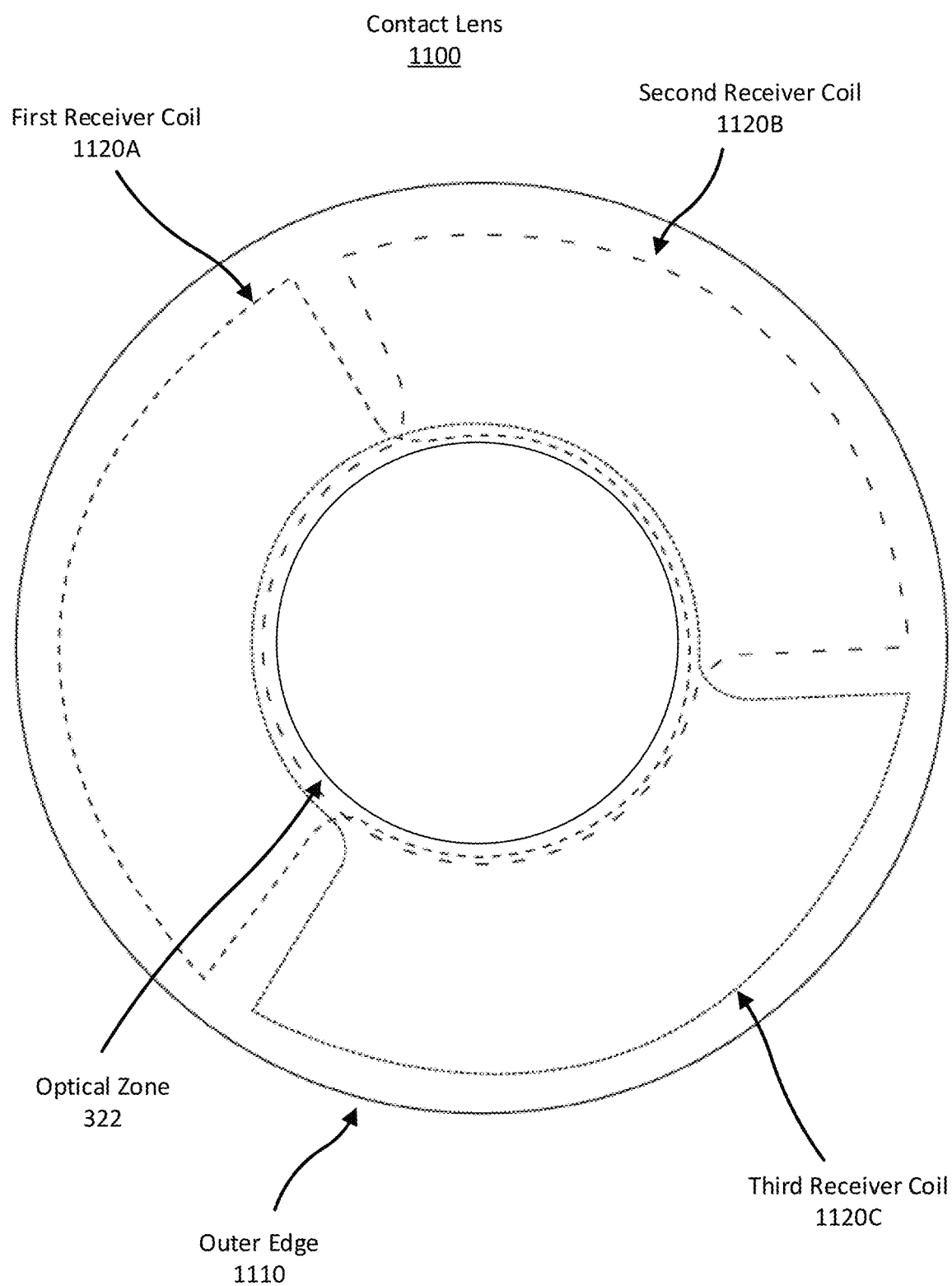
FIG. 11 illustrates a plan view of a contact lens including three conductive coils that generate a time-varying current from a time-varying magnetic field.

FIG. 11 illustrates a plan view of a contact lens 1100 including three receiver coils 1120A-C that generate a TVC from a TVMF. Here, the receiver coils 1120 share characteristics of both the receiver coils shaped as annuli (illustrated in FIG. 7A) and the ellipse-shaped receiver coils shaped as ellipses (illustrated in FIG. 10A). In this example, each receiver coil has a base portion and a head portion. A base portion spans a portion of an annulus near the outer edge 1110 of the lens and a head portion spans a portion of the annulus outside of the optical zone 322. In combination, the base portions of the receiver coils 1120 collectively span an annulus similar to the receiver coils of FIG. 9B. Collectively, the head portions span an inner perimeter of the annulus about the optical zone 322. In this example, the base portion of each receiver coil 1120 spans approximately 110° of the annulus with approximately a 10° separation between each receiver coil. Likewise, the head portion of each receiver coil 1120 spans approximately 125° of the annulus around the optical zone 322 such that the head portion of each receiver coil 1120 overlaps with the head portions of each other receiver coil 1120. In this example, the planes defined by the receiver coils 1120 are rotated by 120° relative to the planes of the other receiver coils 1120.

Figure 12:
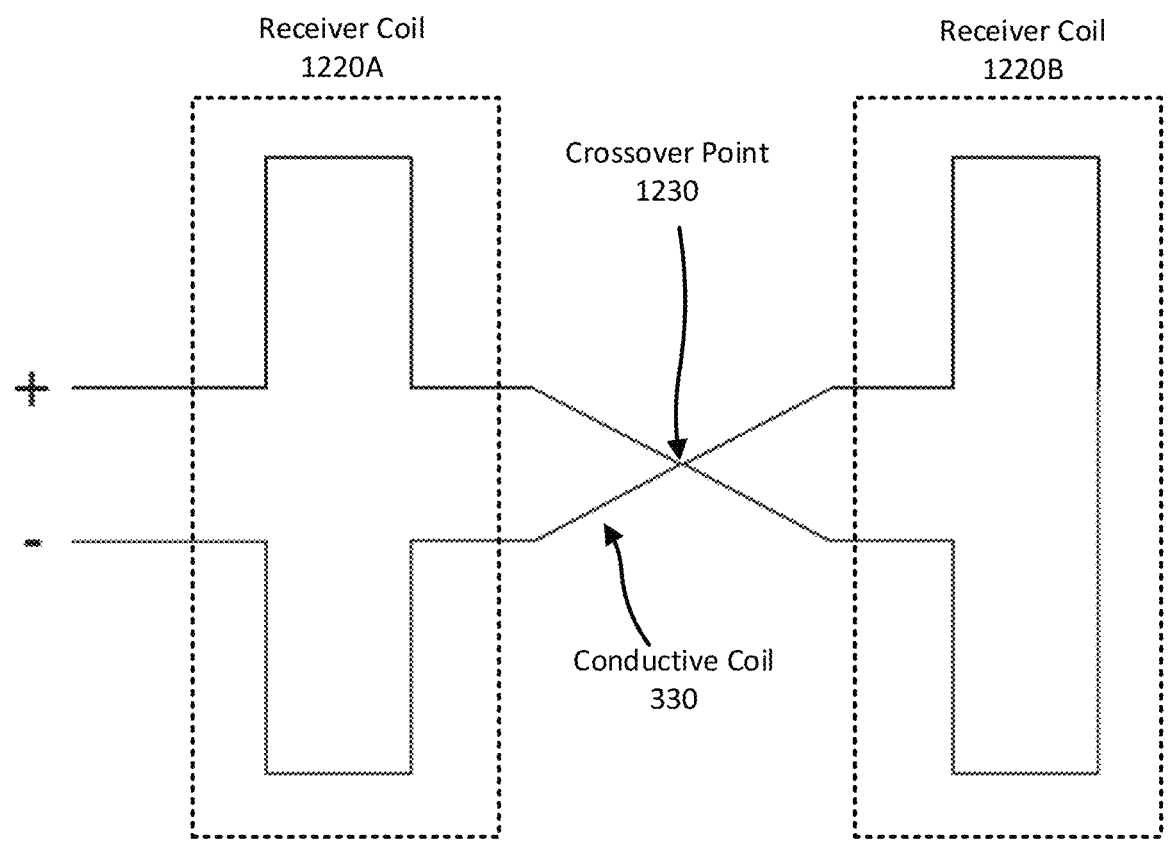
FIG. 12 is a diagram of two receiver coils within a contact lens formed from a single conductive coil.

In some examples, two receiver coils can be formed from the same embedded conductive coil. For example, FIG. 12 is a diagram of two receiver coils within a contact lens formed from a single conductor, receiver coil 1220A and receiver coil 1220B. In some embodiments, pairs of receiver coils are positioned within the contact lens on opposing sides of the optical zone from one another. For example, referring to FIG. 7A, the second receiver coil 720B and the fourth receiver coil 720D can be a pair of receiver coils formed from the same embedded conductive coil.

Returning to FIG. 12, the embedded conductive coil 330 is wound to include a crossover point 1230. Without the crossover point, a TVMF passing through the pair of coils induces a TVC in one direction (e.g., polarity) in one receiver coil and a TVC in the opposing direction in the other receiver coil. The two TVCs cancel each other out, which leads to reduced power generation and motion tracking capability for the contact lens. When the crossover point is included, the two coils generate TVCs in the same direction, which can leads to improved power generation and motion tracking in the contact lens.

In other examples, two receiver coils 1220 and a crossover point 1230 can be alternatively positioned and connected within a contact lens. In these configurations, the TVCs generated by each receiver coil can cancel (or add) to varying degrees in the presence of a TVMF because the TVCs are dependent on the position of the coils in the contact lens and the way they are connected.

Although the detailed description contains many specifics, these should not be construed as limiting the scope of the invention but merely as illustrating different examples. It should be appreciated that the scope of the disclosure includes other embodiments not discussed in detail above. For example, the technologies described are applicable to eye-mounted displays other than the specific types described above. Examples include displays in contact lenses other than scleral contact lenses, and also intraocular displays. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A contact lens comprising:
   three conductive coils coupled to or embedded within the contact lens, each conductive coil for generating an electrical signal from a time-varying electromagnetic field, each conductive coil defining a corresponding plane such that no two corresponding planes are parallel.

2. The contact lens of claim 1, further comprising:
   an energy harvesting circuit coupled to the three conductive coils for converting the electrical signals generated by the three conductive coils into power.

3. The contact lens of claim 2, wherein the amount of power produced by the energy circuit from a conductive coil is based on an orientation of the corresponding plane defined by the conductive coil relative to a direction of the time-varying electromagnetic field.

4. The contact lens of claim 1, further comprising:
   an orientation sensing circuit coupled to the three conductive coils for determining an orientation of the contact lens based on the electrical signals generated by the three conductive coils.

5. The contact lens of claim 1, wherein a perimeter of a first conductive coil of the three conductive coils defines a corresponding plane that is orthogonal to a vector connecting a center of a pupil of a wearer of the contact lens and a center of the contact lens.

6. The contact lens of claim 5, wherein
   the first conductive coil is located between the center of the contact lens and the other conductive coils.

7. The contact lens of claim 1, wherein each conductive coil extends between 100 degrees and 140 degrees around a base of the contact lens.

8. The contact lens of claim 1, wherein each conductive coil comprises a top portion and a bottom portion, wherein the top portion and the bottom portion are substantially parallel.

9. The contact lens of claim 1, wherein each conductive coil surrounds a center of the contact lens.

10. The contact lens of claim 1, wherein the contact lens comprises an optical zone around a center of the contact lens through which light incident upon a retina of an eye passes, and wherein the three conductive coils are positioned within the contact lens such that no conductive coil obstructs the optical zone.

11. The contact lens of claim 1, wherein
two or more of the conductive coils are coupled in series.

12. The contact lens of claim 11, wherein
a first conductive coil and a second conductive coil coupled in series each generate electrical signals of opposing polarities when a time-varying magnetic field passes through the coils.

13. The contact lens of claim 1, further comprising:
one or more additional conductive coils coupled to or embedded within the contact lens, each additional conductive coil for generating an electrical signal from a time-varying electromagnetic field, and each additional conductive coil defining a corresponding additional plane such that no two of the additional corresponding planes and corresponding planes are parallel.

* * * * *